(12) United States Patent
Bluemel

(10) Patent No.: US 12,330,515 B2
(45) Date of Patent: Jun. 17, 2025

(54) BATTERY FRAME

(71) Applicant: MAGNA INTERNATIONAL INC., Aurora (CA)

(72) Inventor: Michael Bluemel, Flatz (AT)

(73) Assignee: MAGNA INTERNATIONAL INC., Aurora (CA)

( * ) Notice: Subject to any disclaimer, the term of this patent is extended or adjusted under 35 U.S.C. 154(b) by 1122 days.

(21) Appl. No.: 17/253,912

(22) PCT Filed: Jun. 25, 2019

(86) PCT No.: PCT/CA2019/050878
§ 371 (c)(1),
(2) Date: Dec. 18, 2020

(87) PCT Pub. No.: WO2020/000090
PCT Pub. Date: Jan. 2, 2020

(65) Prior Publication Data
US 2021/0273285 A1 Sep. 2, 2021

Related U.S. Application Data

(60) Provisional application No. 62/689,629, filed on Jun. 25, 2018.

(51) Int. Cl.
*H01M 50/249* (2021.01)
*B60L 50/64* (2019.01)
(Continued)

(52) U.S. Cl.
CPC ........... *B60L 50/64* (2019.02); *H01M 50/209* (2021.01); *H01M 50/224* (2021.01);
(Continued)

(58) Field of Classification Search
CPC ... B60L 50/64; H01M 50/249; H01M 50/209; H01M 50/242; H01M 50/224; H01M 50/271; H01M 2220/20
(Continued)

(56) References Cited

U.S. PATENT DOCUMENTS

| | | | |
|---|---|---|---|
| 2011/0143179 A1* | 6/2011 | Nakamori | H01M 50/271 429/99 |
| 2013/0192914 A1* | 8/2013 | Nakamori | B60L 50/64 180/68.5 |

(Continued)

FOREIGN PATENT DOCUMENTS

| | | |
|---|---|---|
| CN | 102729792 A | 10/2012 |
| CN | 103367670 A | 10/2013 |

(Continued)

OTHER PUBLICATIONS

Notification of the First Office Action regarding corresponding CN App. No. 201980043353.0 dated Jul. 19, 2022, 11 pgs.; English language translation 14 pgs.

(Continued)

*Primary Examiner* — Jonathan G Jelsma
*Assistant Examiner* — Omar M Kekia
(74) *Attorney, Agent, or Firm* — Dickinson Wright PLLC

(57) ABSTRACT

A battery frame for holding one or more battery boxes includes an outer frame surrounding an interior space and formed from a plurality of structural members including first rails extending parallel to and spaced apart from one another and second rails between the first rails and perpendicularly thereto. The outer frame defines a top extending in a flat plane and a bottom. Each of the first rails includes a mounting flange extending outwardly away from the interior space for holding the battery frame to a vehicle structure. One or more battery boxes are disposed within the interior (Continued)

space of the outer frame and are removable from below the outer frame with the outer frame mounted within a vehicle. Support members and cross-beams provide structural rigidity, distribute or absorb crash loads, and hold one or more of the battery boxes within the battery frame.

14 Claims, 24 Drawing Sheets

(51) Int. Cl.
*H01M 50/209* (2021.01)
*H01M 50/224* (2021.01)
*H01M 50/242* (2021.01)
*H01M 50/271* (2021.01)

(52) U.S. Cl.
CPC ....... *H01M 50/242* (2021.01); *H01M 50/249* (2021.01); *H01M 50/271* (2021.01); *H01M 2220/20* (2013.01)

(58) Field of Classification Search
USPC .......................................................... 429/186
See application file for complete search history.

(56) References Cited

U.S. PATENT DOCUMENTS

| | | | |
|---|---|---|---|
| 2014/0219837 A1* | 8/2014 | Lee | H01M 50/209 429/7 |
| 2014/0284125 A1 | 9/2014 | Katayama et al. | |
| 2015/0024246 A1 | 1/2015 | Buck et al. | |
| 2015/0214531 A1* | 7/2015 | Sun | H01M 50/271 429/120 |
| 2015/0311485 A1 | 10/2015 | Fister et al. | |
| 2017/0012330 A1* | 1/2017 | Kim | H01M 10/663 |
| 2017/0225588 A1 | 8/2017 | Newman | |
| 2017/0320381 A1 | 11/2017 | Milton et al. | |
| 2018/0050607 A1 | 2/2018 | Matecki | |
| 2018/0111483 A1 | 4/2018 | Nakayama | |
| 2019/0273231 A1* | 9/2019 | Günther | H01M 50/224 |
| 2020/0062130 A1 | 2/2020 | Wuensche | |
| 2021/0129651 A1* | 5/2021 | Klomberg | B60L 3/0046 |

FOREIGN PATENT DOCUMENTS

| | | |
|---|---|---|
| CN | 207474523 U | 6/2018 |
| EP | 3331055 A1 | 6/2018 |
| FR | 3001185 B1 | 3/2015 |
| JP | 2015118824 A | 6/2015 |
| WO | 2012160557 A2 | 11/2012 |
| WO | 2018105957 A1 | 6/2018 |
| WO | 2018105981 A1 | 6/2018 |

OTHER PUBLICATIONS

Extended European Search Report regarding corresponding EP App. No. 19826635.5; dated Mar. 14, 2022.

* cited by examiner

BATTERY FRAME

CROSS-REFERENCE TO RELATED APPLICATIONS

This U.S. National Stage Patent application claims the benefit of PCT International Patent Application Serial No. PCT/CA2019/050878 filed Jun. 25, 2019 entitled "BATTERY FRAME" which claims the benefit of U.S. Provisional Patent Application Ser. No. 62/689,629 filed on Jun. 25, 2018, and titled "Battery Frame", the entire disclosures of which are hereby incorporated by reference.

FIELD

The present disclosure relates generally to a battery frame. More specifically, the present disclosure relates to a battery frame for an electrified vehicle.

BACKGROUND

Electrified vehicles, such as such as battery electric vehicles (EVs) and plug-in hybrid electric vehicles (PHEVs), rely upon batteries to store electrical energy. Packing of batteries within such electrified vehicles requires a number of design considerations, including weight distribution, temperature regulation, and serviceability.

There is a large and growing market for electric vehicles, and particularly for electric vehicles having batteries that are configured to be serviceable without requiring an entire conventional battery pack to be removed from the vehicle, which may require special equipment and/or training due to the size and weight of conventional battery packs.

SUMMARY

The present disclosure provides a battery frame comprising a plurality of structural members defining an outer frame having a flat shape with a length and a width and a height shorter than the length and shorter than the width. At least one battery box is disposed within the outer frame and is removable from below the outer frame with the outer frame mounted within a vehicle.

BRIEF DESCRIPTION OF THE DRAWINGS

Further details, features and advantages of designs of the invention result from the following description of embodiment examples in reference to the associated drawings, in which a battery frame is disclosed.

DETAILED DESCRIPTION

Figure 1:
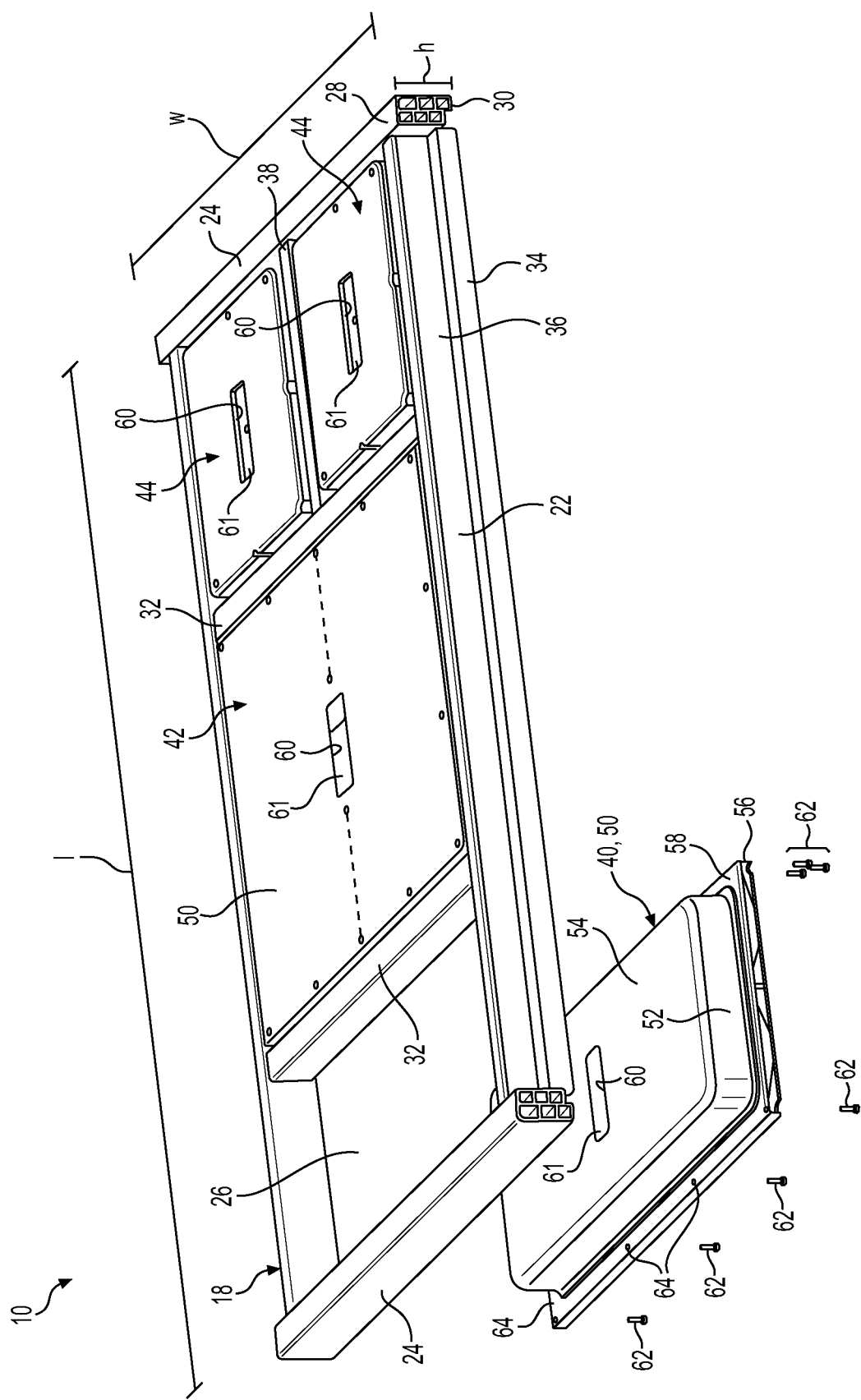
FIG. 1 is a partially exploded perspective view of a battery frame and a battery box in accordance with an aspect of the disclosure.

Recurring features are marked with identical reference numerals in the figures, in which example embodiments of a battery frame are disclosed. The present disclosure provides a battery frame comprising a plurality of structural members defining an outer frame having a flat shape with a length and a width and a height that is shorter than the length and shorter than the width. At least one battery box is disposed within the outer frame and is removable from below the outer frame with the outer frame mounted within a vehicle. In some embodiments, the height is substantially shorter than each of the length and the width.

In some embodiments, the battery frame includes two or more battery boxes that are each configured to be independently installed within the outer frame. In some embodiments, the battery frame includes a battery chamber for holding batteries, with the battery chamber being watertight independent of any structurally-loaded joints. In other words, the battery chamber or chambers may remain watertight even if all structurally-loaded joints are or become permeable to water. In some embodiments, the structural members include a first structural member joined to a second structural member by a structural joint configured to hold a load force, and a watertight seal extends between the first structural member the second structural member and spaced apart from the structural joint. The structural joint may include a friction stir weld. Alternatively or additionally, the watertight seal may include a friction stir weld.

In some embodiments, the structural members may comprise two first rails extending parallel to and spaced apart from one another and two second rails extending parallel to and spaced apart from one another and perpendicular to the first rails. At least one of the first rails or the second rails may be formed of metal having a constant cross-section along all or substantially all of a length thereof. In some embodiments, at least one of the first rails or the second rails is formed of extruded aluminum.

In some embodiments, the battery frame includes two or more battery boxes having different sizes. In some embodiments at least one battery box of the battery frame comprises a housing having a peripheral wall and a floor pan and defining an open top, with a lid enclosing the open top of the housing. Furthermore, the battery box may be held within the outer frame by a bracket supporting the battery box and with a fastener connecting the bracket to one of the structural members of the outer frame.

In some embodiments, at least one battery box of the battery frame includes a cover sealed to a baseplate of extruded metal. The cover may include a lower flange disposed between the baseplate and one of the structural members of the outer frame. The baseplate of extruded metal may comprise two elongate members of extruded metal secured together along an adjoining side edge of each of the two elongate members. In some embodiments, a structural weld secures the two elongate members of the baseplate together, and a watertight seal extends between the two elongate members and spaced apart from the structural weld.

In some embodiments, at least one battery box of the battery frame comprises a housing having an open bottom, and a floor plate enclosing the open bottom of the housing, the floor plate extending outwardly beyond the housing to define a peripheral flange, with the battery box secured within the outer frame by a fastener to connect the peripheral flange to one of the structural members of the outer frame.

The battery frame of the present disclosure provides for a functional separation by mounting one or more individual battery boxes into one outer frame from below. The functional separation may aid in mounting, assembly, and maintenance of batteries within a vehicle. The battery frame of the present disclosure provides several advantages over conventional battery frames. It provides for battery boxes to be separated from an outer frame in case of a crash, it allows the outer frame to remain within the vehicle during service or in case of repair that necessitates removing one or more battery cells. The battery frame of the present disclosure provides for higher flexibility and easier handling of individual battery boxes when compared with conventional electrified vehicle battery packs. It may provide for enhanced scalability by incorporating two or more battery boxes having different sizes and/or for configuring the battery frame that can be upgraded or downgraded by addition or removal of battery boxes. It also provides for a combination of different materials to be used to optimize the design for various design parameters including, for example, weight, strength, structural rigidity, and cost. In some embodiments, the battery frame is constructed with load absorbing joints separated from watertight joints, such that no structurally-loaded joints are also relied upon to make any portion of the battery frame watertight.

FIG. 1 is a partially exploded perspective view of a battery frame 10 in accordance with some embodiments of the disclosure. The battery frame 10 includes an outer frame 18 formed from a plurality of structural members 22, 24. In some embodiments, and as shown in FIG. 1, the structural members 22, 24 include a set of two first rails 22 extending parallel to and spaced apart from one another. The structural members 22, 24 also include a set of two second rails 24 extending parallel to and spaced apart from one another and extending between the first rails 22 and perpendicularly thereto. The structural members 22, 24 of the outer frame 18 surround an interior space 26. Together, the structural members 22, 24 define a flat rectangular shape with a length/and a width w and a height h that is substantially shorter than the length/and substantially shorter than the width w. The outer frame 18 defines a top 28 extending in a flat plane and a bottom 30 parallel to the top 28 and spaced apart therefrom by the height h of the outer frame 18. A pair of cross-beams 32 extend between the first rails 22 within the interior space 26. The cross-beams 32 may serve a number of different purposes, including holding and/or distributing weight of one or more battery boxes 40, 42, to increase stiffening or structural rigidity of the battery frame 10, and/or distributing or absorbing crash loads.

As shown in FIG. 1, each of the first rails 22 includes a mounting flange 34 extending outwardly away from the interior space 26 for holding the battery frame 10 to a vehicle structure. The first rails 22 each define a cutout area 36 above the mounting flanges 34 to receive a corresponding portion of the vehicle. The mounting flanges 34 and the corresponding cutout areas 36 of the first rails 22 may function to locate the battery frame 10 within the vehicle structure.

One or more battery boxes 40, 42, 44 are disposed within the interior space 26 of the outer frame 18 and are removable from below the outer frame 18 with the outer frame 18 mounted within a vehicle. In other words, the battery frame 10 is configured to allow one or more of the battery boxes 40, 42, 44 to be removed and/or installed through the bottom 30 of the outer frame 18 while the outer frame 18 is installed within a vehicle. The battery frame 10 may, for example, be mounted within a floor and/or between frame rails of a vehicle such as a passenger car or truck. Each of the battery boxes 40, 42, 44 may be separately or independently removable and/or installable from below the outer frame 18 with the battery frame 10 mounted as all or part of a lower part of a vehicle. This may improve serviceability and/or manufacturability when compared to conventional (unitary) battery packs, which can weigh several hundred pounds, by allowing individual ones of the battery boxes 40, 42, 44 to be installed or replaced without requiring the entire battery frame 10 to be removed from the vehicle.

In some embodiments, and as shown in FIG. 1, two or more battery boxes 40, 42, 44 having different sizes are disposed within the battery frame 10. Specifically, FIG. 1 shows a first battery box 40 shown removed from the outer frame 18 for illustrative purposes. FIG. 1 also shows a second battery box 42 larger than the first battery box 40 and mounted between two of the cross-beams 32. FIG. 1 also shows a set of two third battery boxes 44, which may each have a similar or identical construction. A support member 38 extends through the interior space 26 between the two third battery boxes 44 from one of the cross-beams 32 to one of the second rails 24. The battery frame 10 may include any number of support members 38, which may serve a number of different purposes, including stiffening or structural rigidity of the battery frame 10, and/or distributing or absorbing crash loads. The cross-beams 32 and/or the support members 38 may also function as mounting supports for holding one or more of the battery boxes 40, 42, 44 within the battery frame 10.

Each of the battery boxes 40, 42, 44 includes a housing 46 with a lid 54 that is co-planar with the top 28 of the outer frame 18 with the corresponding one of the battery boxes 40, 42, 44 installed within the battery frame 10. The lids 54 of each of the battery boxes 40, 42, 44 define a port 60 to provide access to a battery chamber 61 within the housing 46. The battery chamber 61 may be configured to hold one or more battery cells. The battery chamber 61 may also be configured to hold ancillary equipment, such as electrical conductors for charging and discharging the battery cells and/or temperature regulation equipment, such as heaters, radiators, or conduits for conveying heating or cooling fluids. The port 60 may be used for electrical connections to one or more external conductors (not shown) and/or for coolant fluid connections between the corresponding one of the battery boxes 40, 42, 44 and external fluid conduits (not shown).

In some embodiments, and as shown in FIG. 1, the first battery box 40 includes the housing 50 having an inverted-tray shape with a peripheral wall 52 fixed to or integrally formed with the lid 54. The peripheral wall 52 is fixed to a baseplate 56 along a box flange 58 that extends outwardly from the peripheral wall opposite the lid 54. The baseplate 56 may have a generally flat shape to enclose the bottom of the housing 50 of the first battery box 40. The baseplate 56 may be formed from one or more pieces of extruded metal, such as aluminum, magnesium, or an alloy of two or more metals. The pieces of extruded metal may have a constant cross-section along all or substantially all of their length. Alternatively, the baseplate 56 may be formed from one or more sheets of material, such as metal. Other materials, such as, for example, composites or polymers, may be used to form the housing 50 and/or the baseplate 56 of the battery boxes 40, 42, 44.

The battery boxes 40, 42, 44 are secured within the battery frame 10 using one or more mounting screws 62 to hold corresponding portions of the battery boxes 40, 42, 44 to one or more of the structural members 22, 24 of the outer frame 18 and/or to one or more of the cross-beams 32 and/or the support members 38. The mounting screws 62 may extend through corresponding holes 64 in the box flanges 58. Other types of fasteners may be used to secure the battery boxes 40, 42, 44 within the battery frame 10. Such fasteners may include, for example, bolts, nuts, rivets, clips, clamps, tabs, or latches.

FIGS. 2-6 show a battery frame 100 holding two battery boxes 140 in accordance with some embodiments. Specifically, the battery frame 100 includes an outer frame 118 formed from structural members 122, 124 including a set of two first rails 122 extending parallel to and spaced apart from one another. The structural members 122, 124 also include a set of two second rails 124 extending parallel to and spaced apart from one another and extending between the first rails 122 and perpendicularly thereto. Together, the structural members 122, 124 surround an interior space 126. The first rails 122 each include a mounting flange 134 extending outwardly away from the interior space 126 and defining a plurality of through holes 136 at regular intervals along a length of the first rails 122 for receiving fasteners, such as bolts or screws, for holding the battery frame 100 within a vehicle.

A cross-beam 132 extends between the first rails 122 within the interior space 126 mid-way between the second rails 124. The cross-beam 132 may serve a number of different purposes, including holding and/or distributing weight of one or more battery boxes 140, to increase stiffening or structural rigidity of the battery frame 100, and/or distributing or absorbing crash loads.

Two battery boxes 140 are disposed within the interior space 126 of the battery frame 100 on opposite sides of the cross-beam 132. Each of the battery boxes 140 includes a lid 154 that defines a port 160 to provide access to a battery chamber 161 within the battery box 140. The ports 160 may be used for electrical connections to one or more external conductors (not shown) and/or for coolant fluid connections between the battery boxes 140 and external fluid conduits (not shown). A pair of upper ribs 162 disposed on an inner surface of the lid 154 within the interior space 126 and on opposite sides of the port 160 to provide structural rigidity.

One or more of the battery boxes 140 are removable from below the outer frame 118 with the outer frame 118 mounted within a vehicle. In other words, the battery frame 100 is configured to allow one or more of the battery boxes 140 to be removed and/or installed through the bottom 130 of the outer frame 118 while the outer frame 118 is installed within a vehicle. The battery frame 100 may, for example, be mounted within a floor and/or between frame rails of a vehicle such as a passenger car or truck. Each of the battery boxes 140 may be separately or independently removable and/or installable from below the outer frame 118 with the battery frame 100 mounted as all or part of a lower part of a vehicle. This may improve serviceability and/or manufacturability when compared to conventional (unitary) battery packs, which can weigh several hundred pounds, by allowing individual ones of the battery boxes 140 to be installed or replaced without requiring the entire battery frame 100 to be removed from the vehicle.

Figure 2:
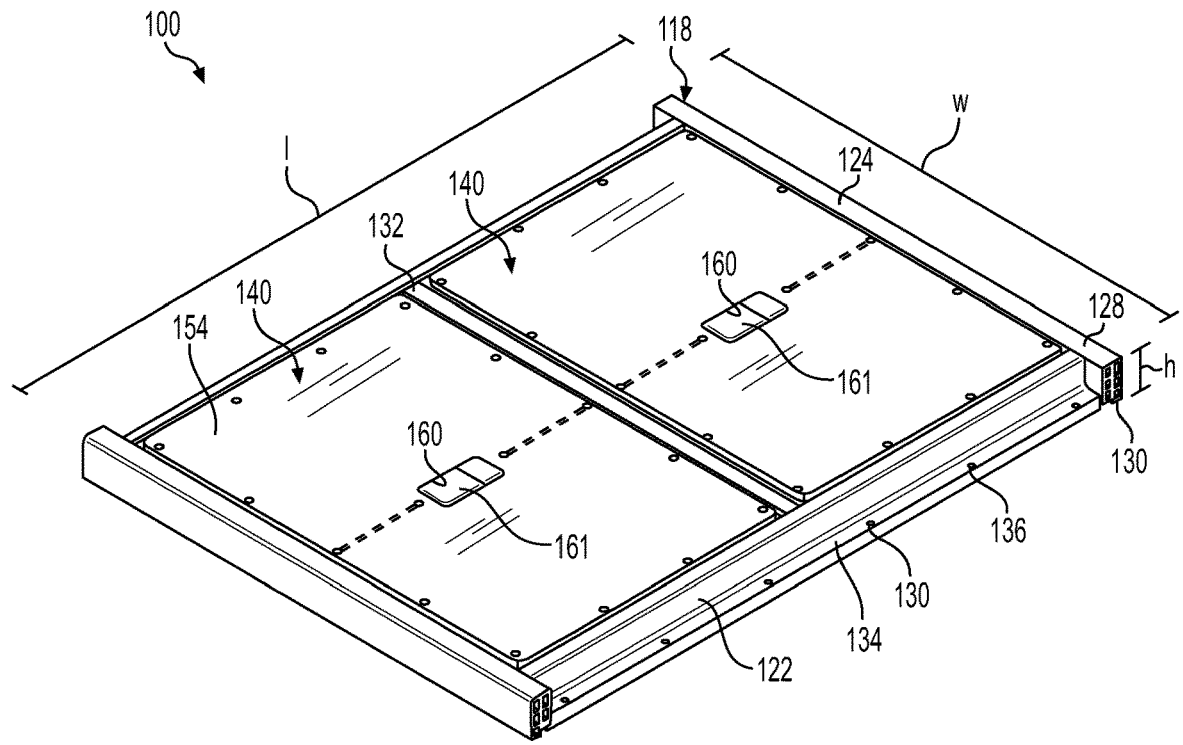
FIG. 2 is a perspective view of a battery frame holding two battery boxes.
Figure 3:
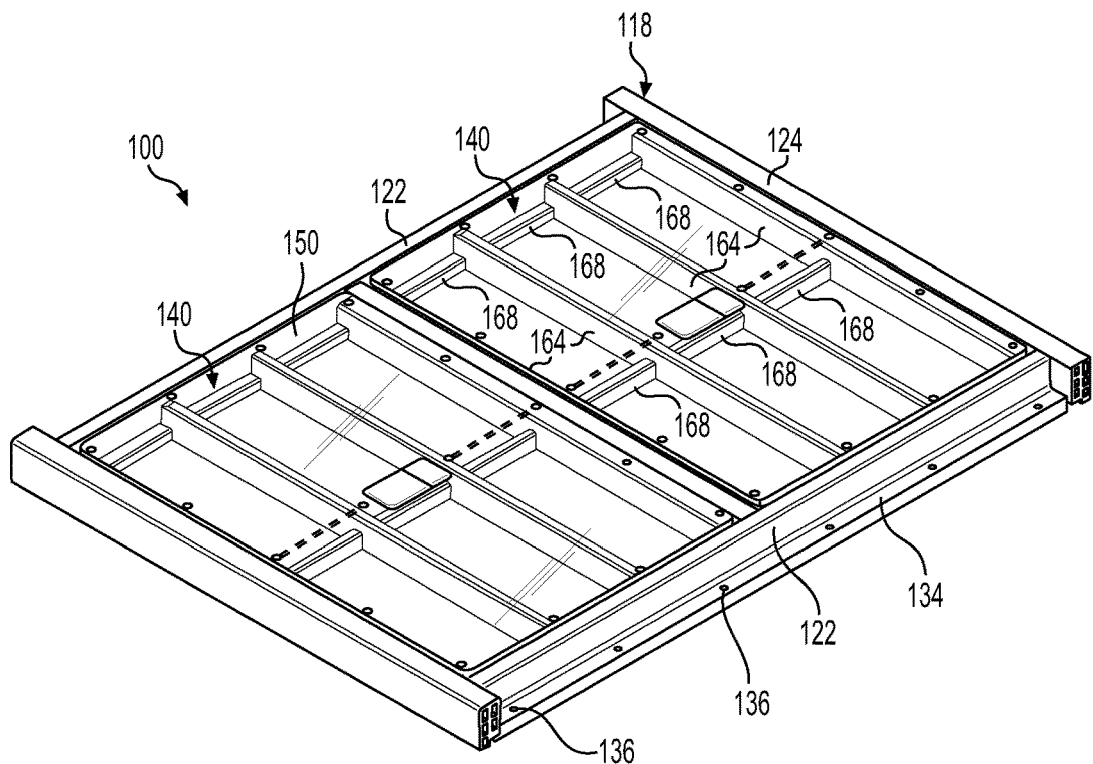
FIG. 3 is a perspective view of the battery frame of FIG. 2 with transparent lids to show structure within the battery boxes in accordance with an aspect of the disclosure.

FIG. 3 is a perspective view of the battery frame of FIG. 2 with the battery boxes 140 having a transparent lid 154 to show structure within the battery boxes 140 in accordance with an aspect of the disclosure. Specifically, FIG. 3 shows a stiffening structure 164, 168 within a housing 150 of each of the battery boxes 140. Each of the battery boxes 140 may have a similar construction, so only one of the battery boxes 140 is labeled in FIG. 3 to simplify the disclosure. The stiffening structures 164, 168 each include four crossbars 164 extending parallel to and spaced apart from one another at regular intervals, with one of the crossbars 164 extending along and adjacent to one of the second rails 124 with the battery box 140 positioned within the outer frame 118. Another one of the crossbars 164 extends along and adjacent to one of the second rails 122 with the battery box 140 positioned within the outer frame 118. Each of the crossbars 164 includes an upper portion 166 that extends generally parallel to the lid 154 for receiving lid bolts 158 (shown in FIGS. 7-8), to secure the lid 154 onto the housing 150. Other types of fasteners, such as screws, clips, or clamps may be used to secure the lid 154 onto the housing 150. Alternatively or additionally, the lid 154 may be secured onto the housing 150 with an adhesive one and/or one or more or welds. The stiffening structure 164, 168 within each of the battery boxes 140 also includes three lower ribs 168 extending parallel to and spaced apart from one another at regular intervals, with one of the lower ribs 168 extending along and adjacent to corresponding ones of the first rails 122 with the battery box 140 positioned within the outer frame 118. Each of the stiffening structures 164, 168 may be fixed within a corresponding the housings 150 by welding or by other means, such as with an adhesive. Alternatively or additionally, one or more parts of the stiffening structures 164, 168 may be integrally formed with one or more parts of the housings 150.

Figure 4:
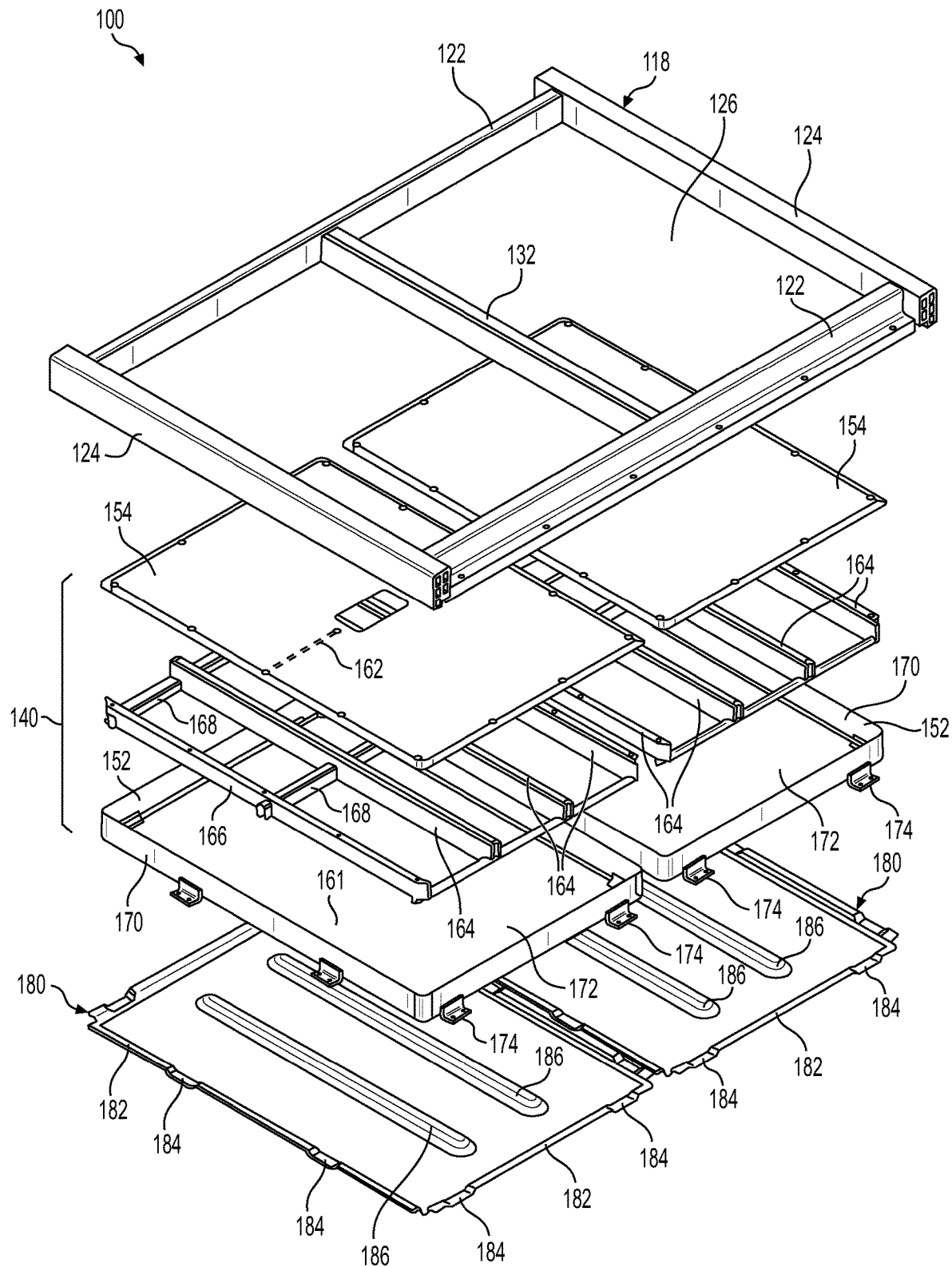
FIG. 4 is an exploded view of the battery frame of FIG. 2.

FIG. 4 is an exploded view of the battery frame of FIG. 2. As best shown in FIG. 4, the lower ribs 168 extend perpendicularly to the crossbars 164. In some embodiments, the lower ribs 168 extend through the crossbars 164. FIG. 4 also shows details of the housings 150 of the battery boxes 140. Specifically, each of the housings 150 is formed as an open tray with a peripheral wall 170 extending vertically and perpendicularly from a floor pan 172 that extends in a flat plane and to an open top 152. One of the lids 154 encloses the open top 152 of each of the housings 150. A plurality of brackets 174 are welded to the housings 150 for holding the battery boxes 140 within the outer frame 118. The brackets 174 may be fixed to the housings 150 in other ways, such as with an adhesive or using one or more fasteners.

FIG. 4 also shows a pair of lower plates 180, each configured to be attached to the outer frame 118 below a corresponding one of the battery boxes 140 for protecting the battery boxes from damage from below. The lower plates 180 may be formed of metal or another resilient material, such as plastic or a composite material to protect the battery boxes 140 from damage due to road debris. The lower plates 180 may also serve to improve performance of the battery frame 100 in various crash tests, such as a bollard crash test. The lower plates 180 may have a generally flat shape with a peripheral edge 182 that is bent upwardly and outwardly and configured to be attached to the outer frame 118. The peripheral edge 182 includes lowered portions 184 extending downwardly away from the outer frame 118 to accommodate the brackets 174 and fasteners in the brackets 174. The lower plates 180 each define a pair of indentations 186 that extend for a length upwardly toward the outer frame to provide structural rigidity. The indentations 186 may be formed by rolling or beading the material of the lower plates 180.

Figure 5:
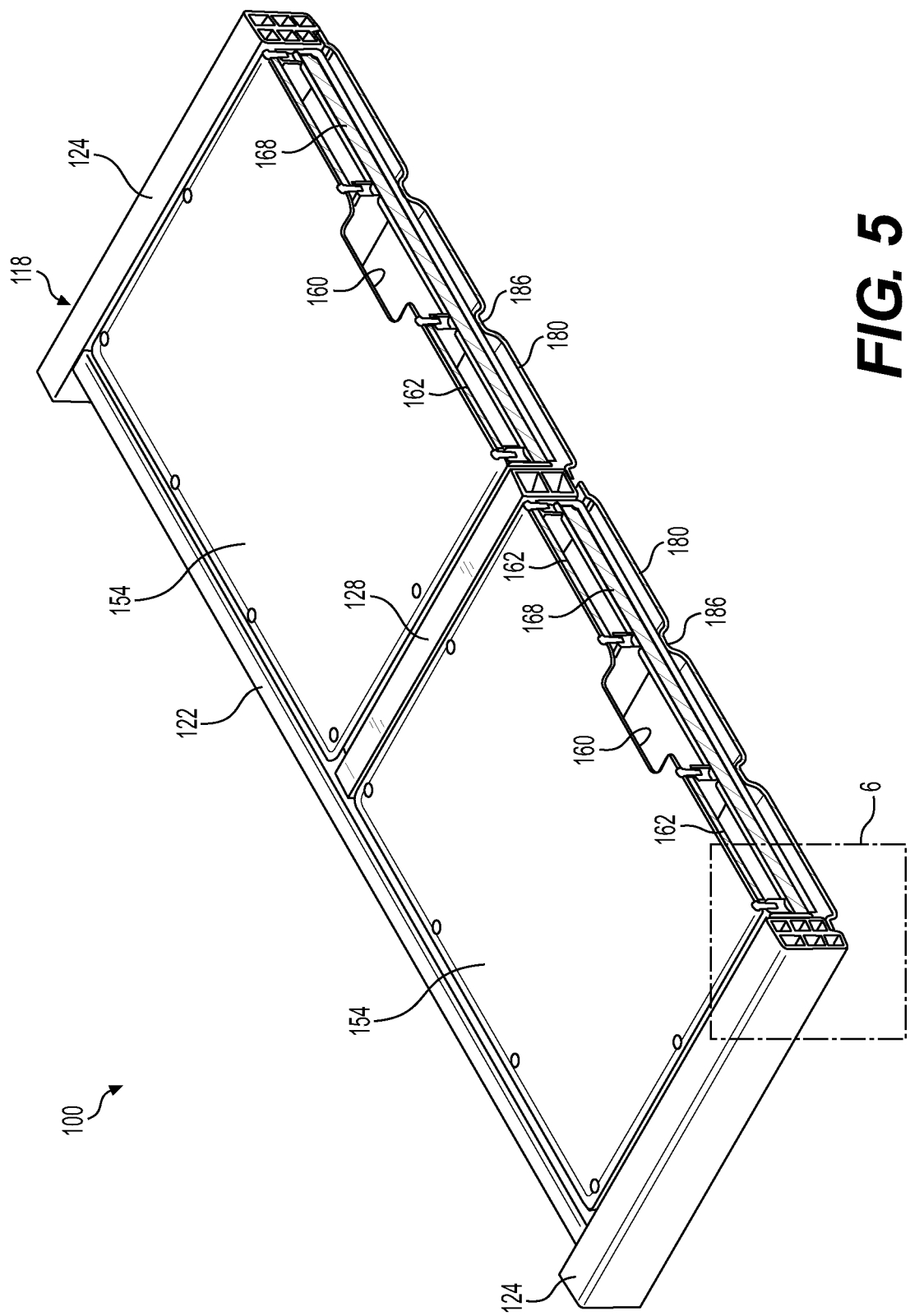
FIG. 5 is a perspective cut-away view of the battery frame of FIG. 2.
Figure 6:
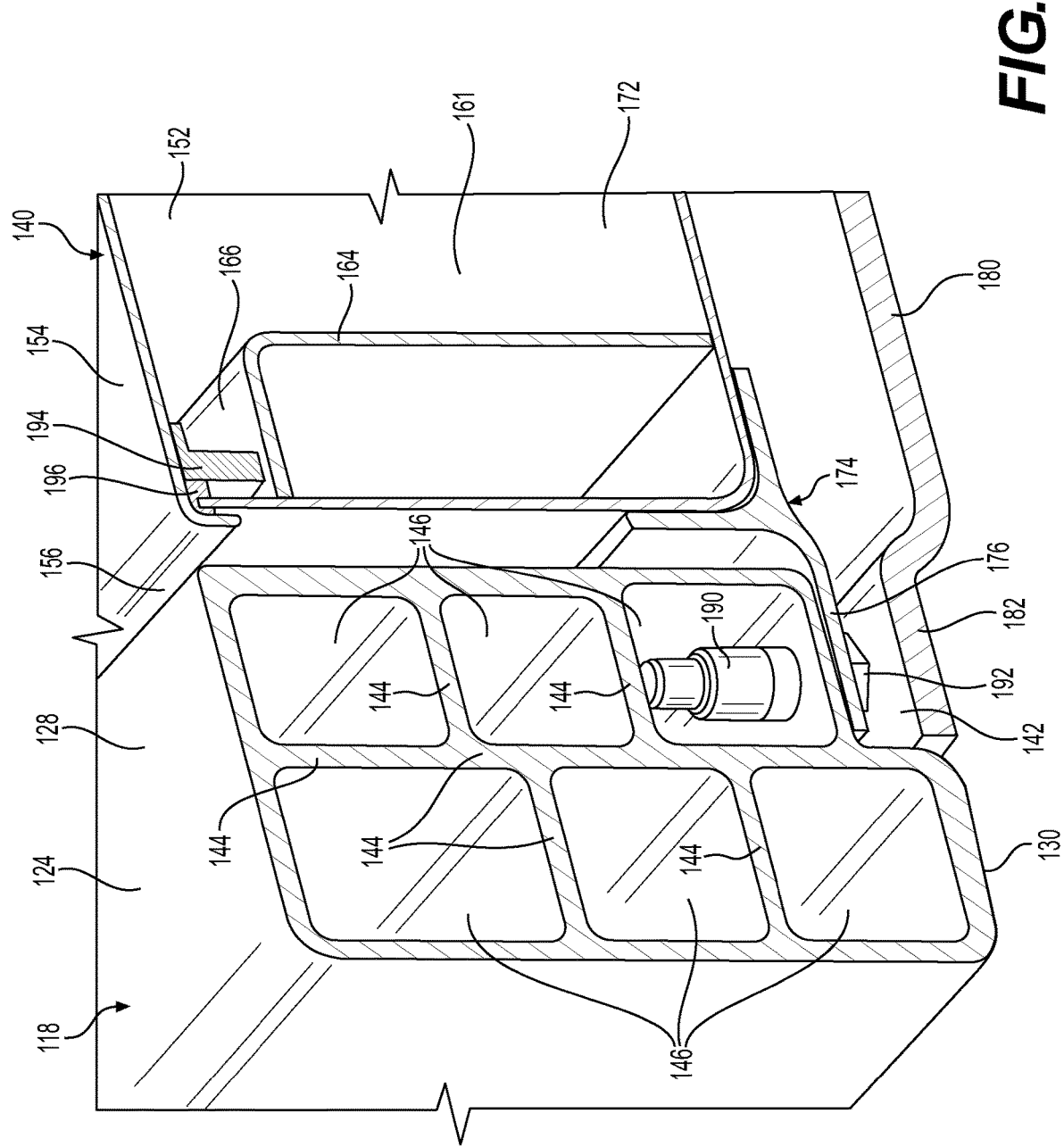
FIG. 6 is an enlarged view of section 6 of FIG. 5

FIG. 5 shows a cross-section of the battery frame 100 of FIG. 2, and FIG. 6 is an enlarged view of section 6 of FIG. 5. Specifically, FIG. 6 shows the connection between one of the battery boxes 140 and the outer frame 118 of the battery frame 100. FIG. 6 shows a cross-section of one of the second rails 124 having a generally rectangular shape except for a notch 142 in a lower edge thereof. The notch 142 faces the interior space 126 of the outer frame 118 for receiving the brackets 174 and the peripheral edge 182 of the lower plates 180. FIG. 6 also shows an internal webbing 144 within the second rail 124 to define a plurality of hollow passages 146 each having a generally rectangular cross-section. A first rivet nut 190 extends upwardly into the second rail 124 within the notch 142 for receiving a mounting bolt 192 for holding the bracket 174 to the second rail 124. More specifically, the bracket 174 has a cross-section shaped as an inverted-T that defines an outward extension 176, with the mounting bolt 192 extending through the outward extension 176 of the bracket 174 and into the first rivet nut 190. In other words, each the battery boxes 140 is held within the outer frame 118 by the brackets 174, which support the battery box 140 with fasteners in the form of the mounting bolts 192, which connect the bracket 174 to one of the structural members 122, 124 of the outer frame 118. Other types of fasteners such as, for example, screws, rivets, clips, or clamps may connect the brackets 174 to the outer frame 118.

As also shown in FIG. 6, a rim 156 extends about a periphery of the lid 154 of the battery box 140 and overhangs the peripheral wall 170. A spacer 194 of rigid material holds the lid 154 a fixed distance off of an upper portion 166 of one of the crossbars 164. A gasket 196 of resilient material, such as rubber, is disposed around the top of the peripheral wall 170 and prevents water or other fluids from entering or exiting the interior space 126 of the battery box 140. The spacer 194 may help the gasket 196 to have a consistent deformation and prevent the gasket 196 from being damaged from concentrated or excessive forces that could be generated by the lid bolts 158 used to hold the lid 154 onto the housing of the battery box 140.

Figure 7:
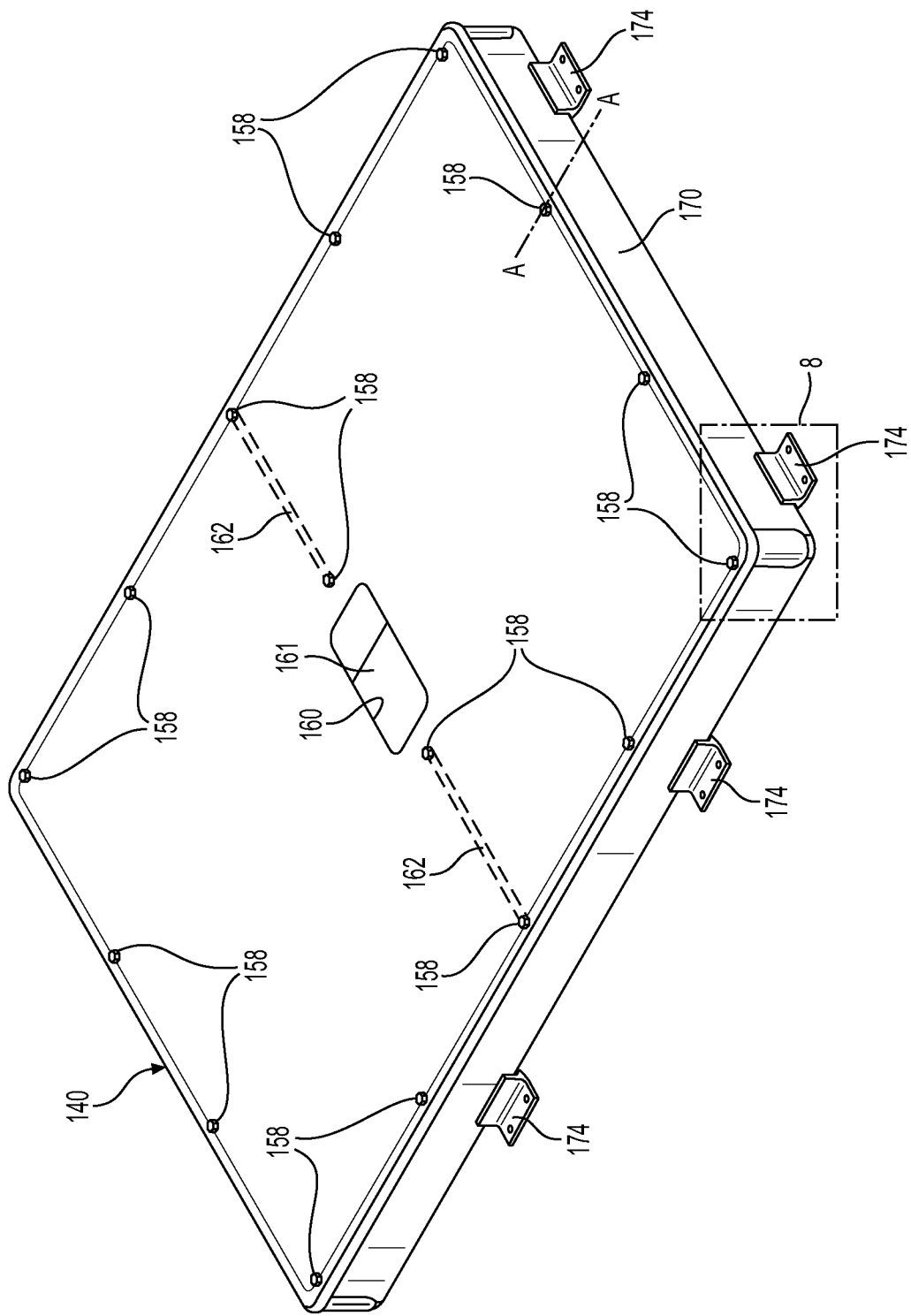
FIG. 7 is a perspective view of a battery box.
Figure 9:
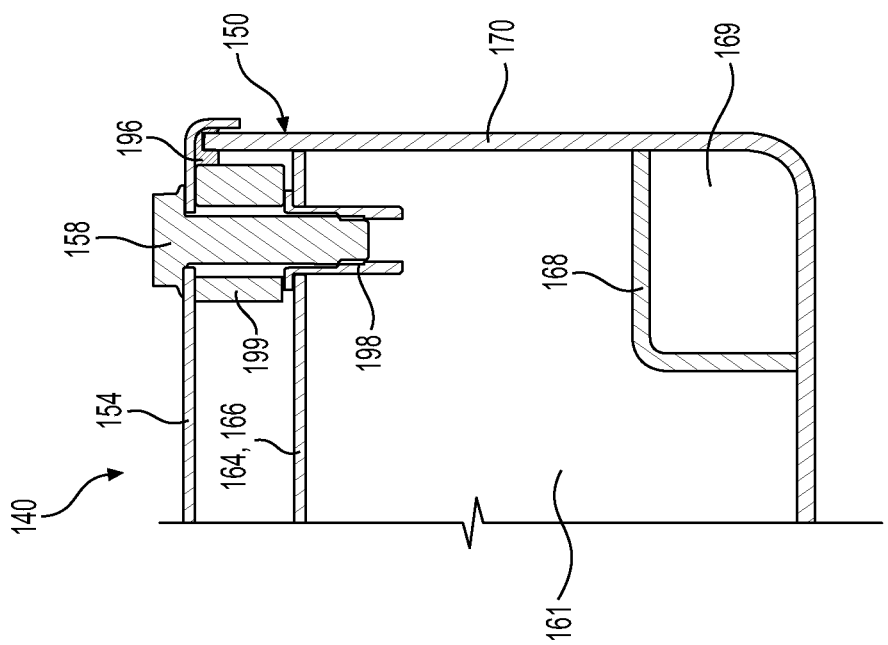
FIG. 9 is a cross-sectional view of the battery box of FIG. 7 along line A-A.
Figure 8:
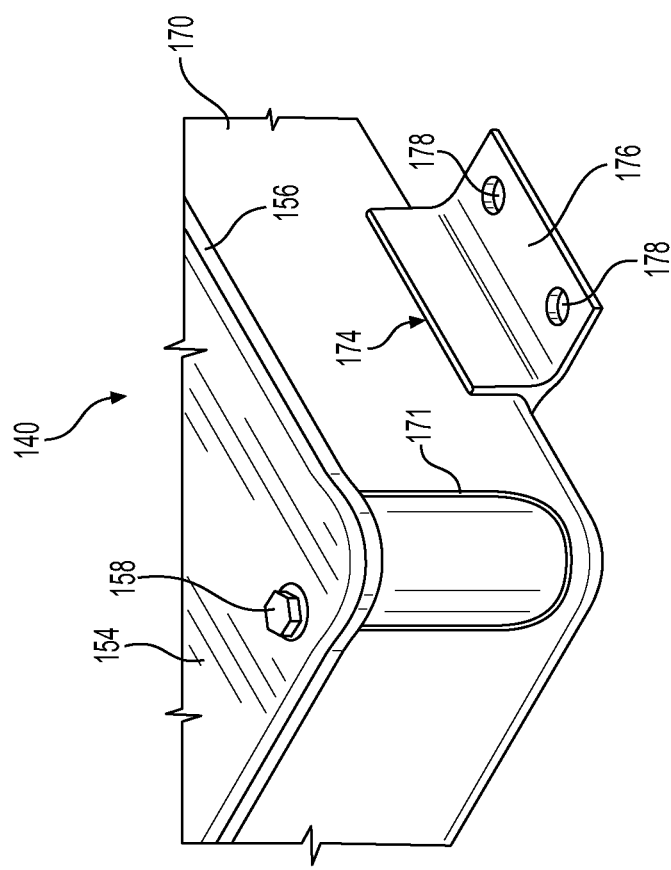
FIG. 8 is an enlarged view of section 8 of the battery box of FIG. 7.

FIGS. 7-9 show additional details of one of the battery boxes 140. FIG. 8 is an enlarged section of FIG. 7; FIG. 9 is a cross-sectional view of FIG. 7 along line A-A. Specifically, FIG. 8 shows a corner weld 171 at a corner of the peripheral wall 170 to interconnect two perpendicular of the peripheral wall 170. The corner weld 171 may be a watertight weld, such as a friction stir weld. FIG. 8 also shows one of the lid bolts 158 in an installed position holding the lid 154 onto the housing 150. FIG. 9 shows a cross-section of the battery box 140 including a second rivet nut 198 disposed within the upper portion 166 of one of the crossbars 164, with the second rivet nut 198 receiving a lid bolt 158 and thus holding the lid 154 onto the housing 150. FIG. 8 also shows a standoff sleeve 199 that surrounds the lid bolt 158 and which extends between the second rivet nut 198 and the lid 154. The standoff sleeve 199 may serve a similar function to the spacer 194, by holding the lid 154 a fixed distance away from the upper portion 166 of one of the crossbars 164 and to prevent the gasket 196 from being damaged from concentrated or excessive forces that could be generated by the lid bolts. FIG. 8 also shows one of the lower ribs 168 defining a passage 169 that may hold electrical conductors and/or as a conduit for cooling or heating fluid used to regulate the temperature of batteries within the battery box 140. FIG. 8 also shows two mounting holes 178 in the outward extension 176 and configured to receive the mounting bolt 192 for securing one of the battery boxes 140 onto the outer frame 120.

The battery frame 100 of FIGS. 2-6 may provide several advantages over other designs, including conventional battery packs. The battery frame 100 may be made without post-machining of weld seams. It provides for separation of outer loads from watertight battery boxes 140. The battery boxes 140 may be constructed as a simple stamped part with inner reinforcements for holding battery cells. It may provide for smaller battery boxes 140 than conventional designs, which allow for easier repair and handling. The battery boxes 140 can be installed or removed from the outer frame 118 from below, allowing installation or replacement without removing the entire battery frame 100 from the vehicle. The battery frame 100 can be constructed using various combinations of materials.

FIGS. 10-15 show a battery frame 200 in accordance with some embodiments. Specifically, the battery frame 200 includes an outer frame 218 formed from structural members 222, 224 including a set of two first rails 222 extending parallel to and spaced apart from one another. The structural members 222, 224 also include a set of two second rails 224 extending parallel to and spaced apart from one another and extending between the first rails 222 and perpendicularly thereto. Together, the structural members 222, 224 surround an interior space 226. Together, the structural members 222, 224 define a flat rectangular shape with a length /and a width w and a height h that is substantially shorter than the length /and substantially shorter than the width w. The outer frame 218 defines a top 228 extending in a flat plane and a bottom 230 parallel to the top 228 and spaced apart therefrom by the height h of the outer frame 218. The first rails 222 each include a mounting flange 234 extending outwardly away from the interior space 226. A cross-beam 232 extends between the second rails 224 within the interior space 226 mid-way between the first rails 222. The cross-beam 232 may serve a number of different purposes, including stiffening or structural rigidity of the battery frame 200, and/or distributing or absorbing crash loads.

Figure 10:
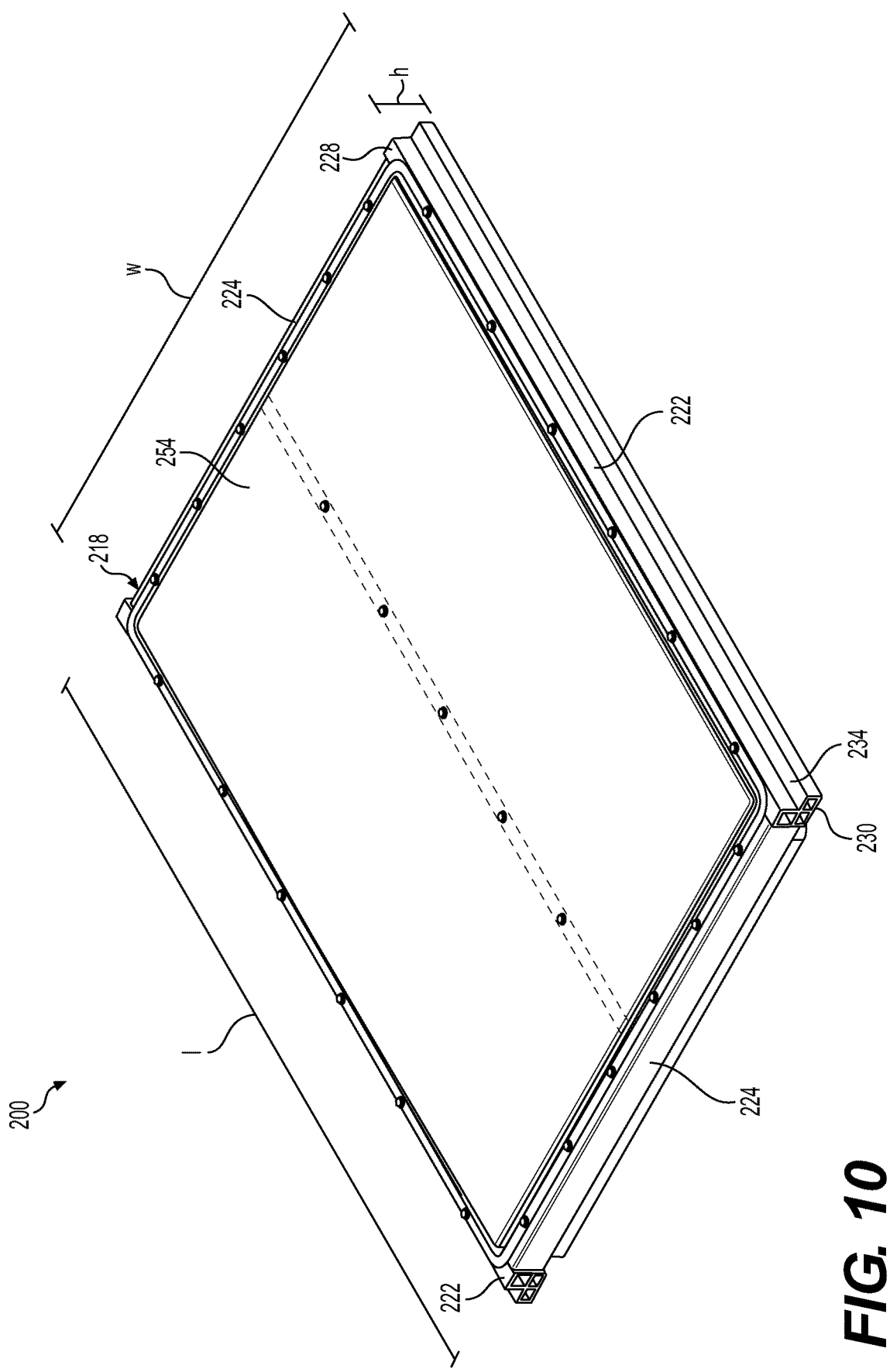
FIG. 10 is a perspective view of a battery frame in accordance with an aspect of the disclosure.
Figure 11:
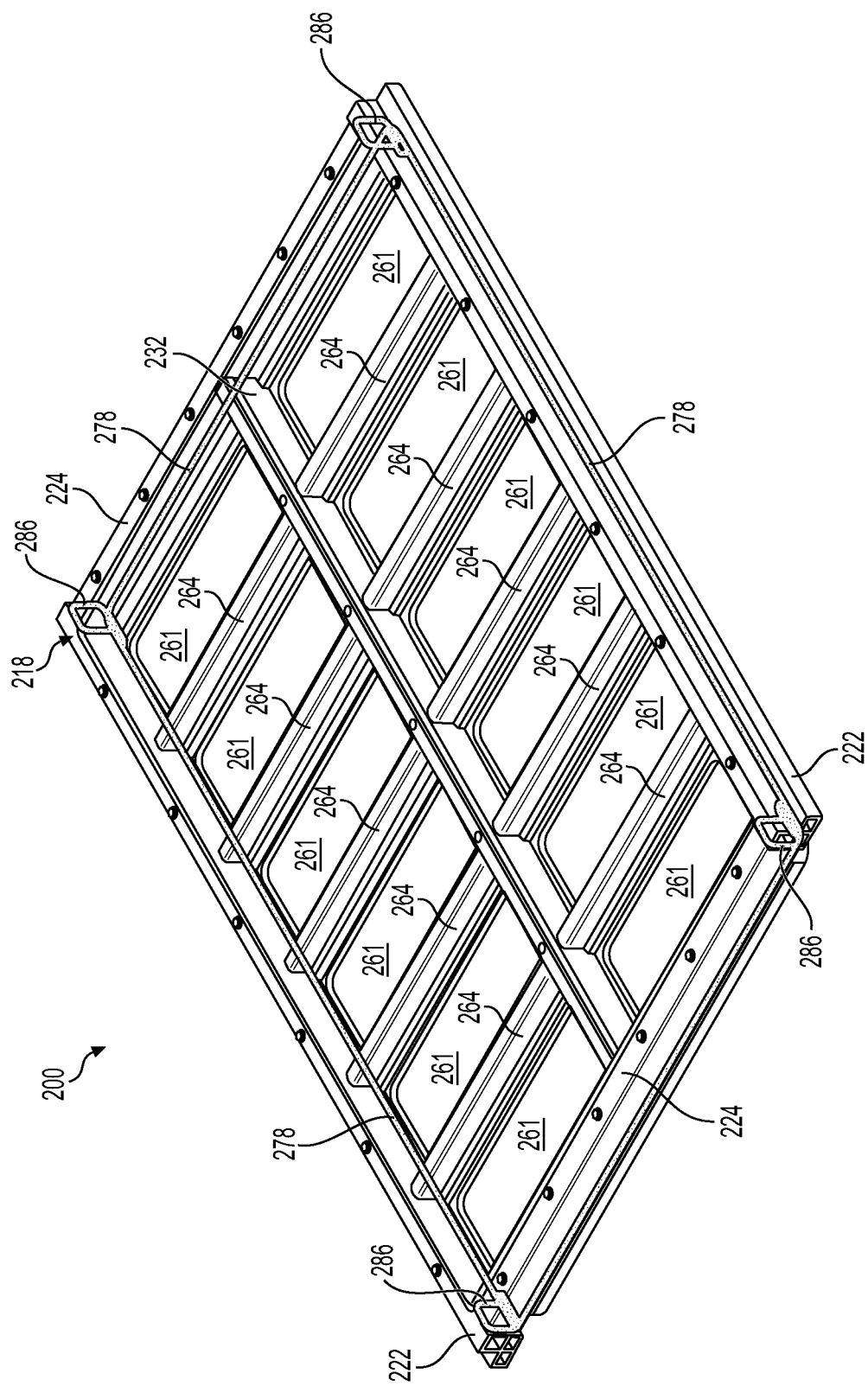
FIG. 11 is a perspective view of the battery frame of FIG. 10 with a partial transparency to illustrate internal structure.

FIG. 11 is a perspective view of the battery frame of FIG. 10 with a partial transparency to illustrate locations of welds 278, 286. Specifically, a lower weld 278 connects a floor pan 272 to each of the structural members 222, 224. The lower welds 278 may be watertight to prevent water or other fluids from entering the interior space 226. In some embodiments, the lower welds 278 may be friction stir welds (FSW), although other types of welds and/or sealants may be used, which may depend on the types of materials used for either or both of the floor pan 272 and/or the structural members 222, 224. FIG. 11 also shows end welds 286 connecting each of two ends of each of the second rails 224 to a side of each of the first rails 222 adjacent an end thereof. The end welds 286 may be watertight to prevent water or other fluids from entering the interior space 226. In some embodiments, the end welds 286 may be friction stir welds, although other types of welds and/or sealants may be used, which may depend on the types of materials used for either or both of the rails 222, 224. As also shown in FIG. 11, a plurality of crossbars 264 extend perpendicularly from the cross-beam 232 to each of the first rails 222 at regular intervals to define twelve battery chambers 261, each having a rectangular shape.

Each of the battery chambers 261 is configured to hold one or more batteries that are removable from below the outer frame 218 with the outer frame 218 mounted within a vehicle. In other words, the battery frame 200 is configured to allow one or more of the batteries to be removed and/or installed through the bottom 230 of the outer frame 218 while the outer frame 218 is installed within a vehicle. The battery frame 200 may, for example, be mounted within a floor and/or between frame rails of a vehicle such as a passenger car or truck. Each of the batteries may be separately or independently removable and/or installable from below the outer frame 218 with the battery frame 200 mounted as all or part of a lower part of a vehicle. This may improve serviceability and/or manufacturability when compared to conventional (unitary) battery packs, which can weigh several hundred pounds, by allowing individual batteries to be installed or replaced without requiring the entire battery frame 200 to be removed from the vehicle.

Figure 12:
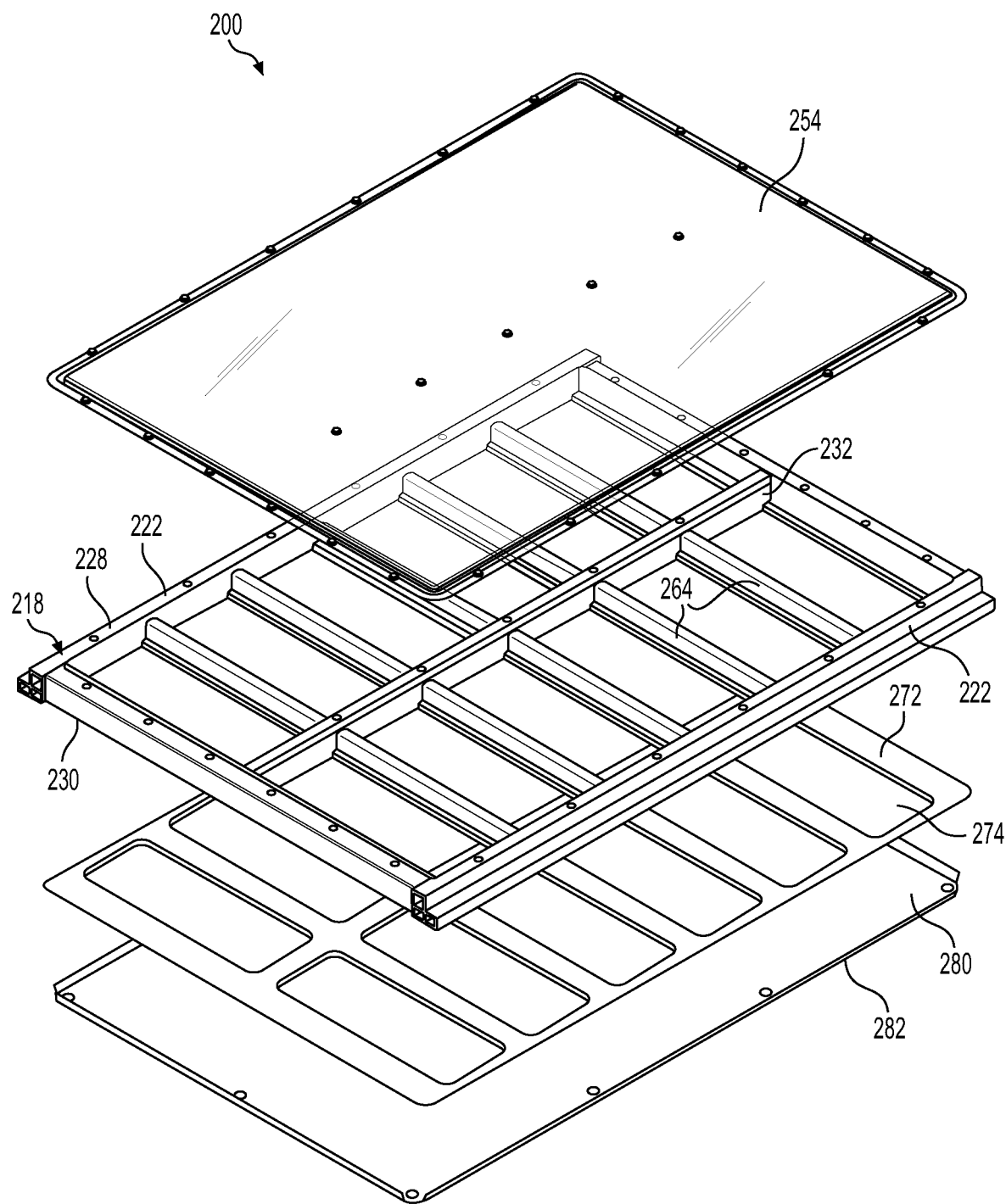
FIG. 12 is an exploded view of the battery frame of FIG. 10.

FIG. 12 is an exploded view of the battery frame 200 of FIG. 10 including a lid 254 that encloses the top 228 of the outer frame 218 and the floor pan 272 that encloses the bottom 230 of the outer frame 218. As shown in FIG. 12, the floor pan 272 includes a plurality of recessed portions 274 that each align with a corresponding one of the battery chambers 261. FIG. 12 also shows a lower plate 280 for protecting batteries and other equipment from damage from below, such as may be caused by road debris. The lower plate 280 may be formed of metal or another resilient material, such as plastic or a composite material. The lower plate 280 may also serve to improve performance of the battery frame 200 in various crash tests, such as a bollard crash test. The lower plate 280 may have a generally flat shape with a peripheral edge 282 that is bent upwardly and outwardly.

Figure 13:
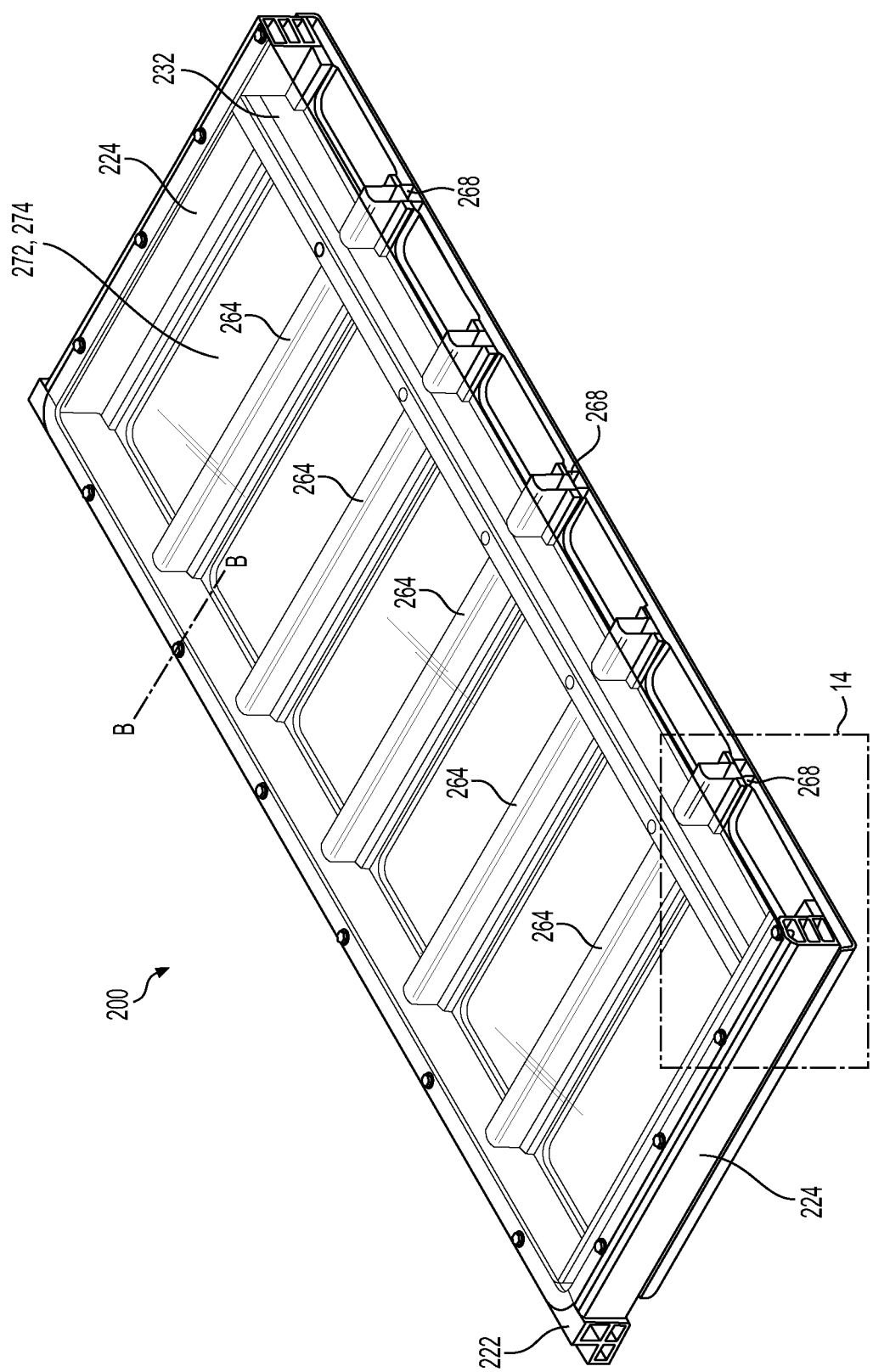
FIG. 13 is a perspective cut-away view of the battery frame of FIG. 10.
Figure 14:
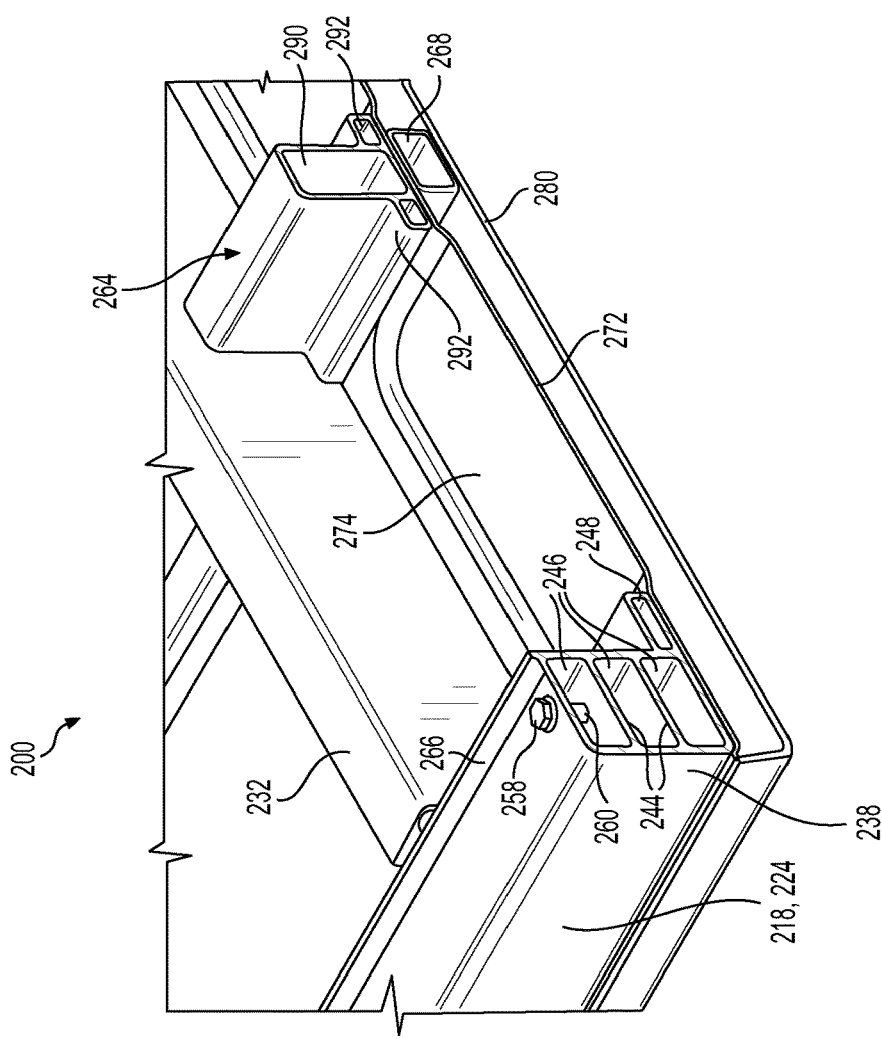
FIG. 14 is an enlarged view of section 14 of FIG. 13.

FIG. 13 is a cut-away perspective view showing a cross-section of the battery frame 200. FIG. 14 is an enlarged view of section 14 of FIG. 13. As shown in FIGS. 13-14, lower ribs 268 having a rectangular cross-section are disposed between three of the crossbars 264 including a center one of the crossbars 264 and two outermost ones of the crossbars 264. The crossbars each are shaped as an inverted-T, with a central portion 290 having a rectangular cross-section and with two side protrusions 292 each having a cross-section extending outwardly therefrom and adjacent to the floor pan 272. FIG. 14 also shows internal details of the second rails 224, with a body portion 238 having a rectangular cross-section and including internal webbing 244 in the form of two horizontal bars within the body portion 238 defining three hollow passages 246, with each of the having a generally rectangular cross-section. The second rails 224 each define a foot 248 extending inwardly toward the interior space and adjacent to the floor pan 272. The feet 248 may function to hold the cross-beam 232 and to distribute loads from the cross-beam 232 to the second rails 224.

Figure 15:
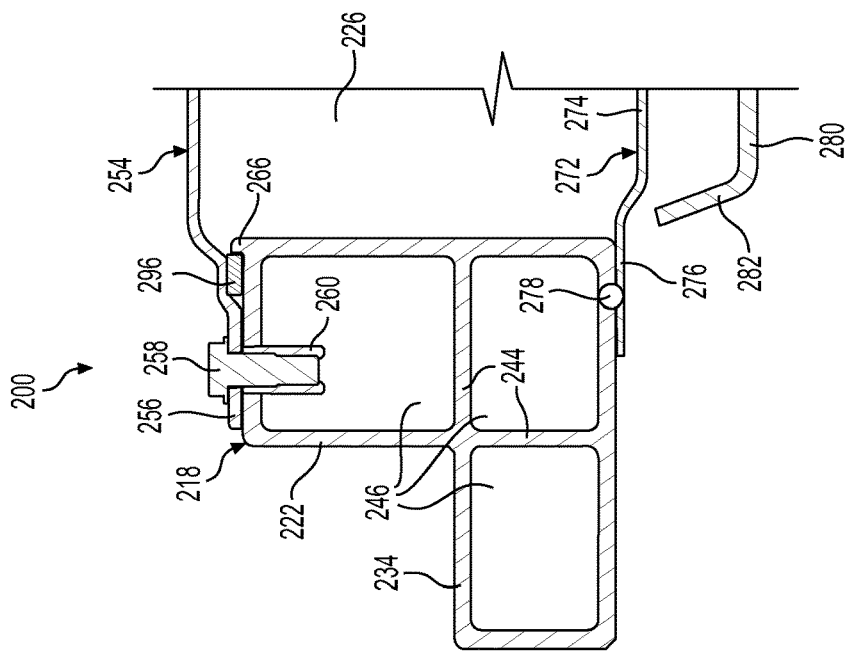
FIG. 15 is a cross-sectional view of the battery box of FIG. 13 along line B-B.

FIG. 15 is a cross-sectional view of FIG. 13 along line B-B. FIG. 15 shows details of one of the first rails 222 having an L-shaped cross-section to define the mounting flange 234 that extends outwardly away from the interior space 226. The first rails 222 also include internal webbing 244 to define three generally rectangular hollow passages 246. The floor pan 272 defines a flange portion 276 that extends outwardly and beneath each of the rails 222, 224. Similarly, the lid 254 defines a rim 256 that extends over each of the rails 222, 224 and is secured thereto with a plurality of lid bolts 258. More specifically, rivet nuts 260 are secured within an upper portion of the rails 222, 224, with each of the rivet nuts receiving a corresponding one of the lid bolts to secure A lip 266 extends upwardly from each of the first rails 222 for holding a gasket 296 that seals between the lid 254 and each of the first rails 222. Each of the second rails 224 may have a similar lip 266 and/or a similar gasket 296. FIG. 15 also shows the lower weld 278 between the flange portion 276 of the floor pan 272 and a lower surface of the first rail 222. A similar lower weld 278 connects the flange portion 276 to the other ones of the rails 222, 224.

The battery frame 200 of FIGS. 10-15 may provide several advantages over other designs, such as conventional battery packs. The battery frame 200 includes the outer frame 218 that is partitioned with inner reinforcements 232, 264 that may distribute and/or absorb crash loads, such as crush loads and/or loads generated in a bollard crash test. The battery frame 200 may be assembled from the top 228 and closed with a single stamping part (i.e. the lid 254). The battery frame 200 may be configured to use a single connection block to provide electrical and/or cooling fluid connections to the vehicle.

Figure 16:
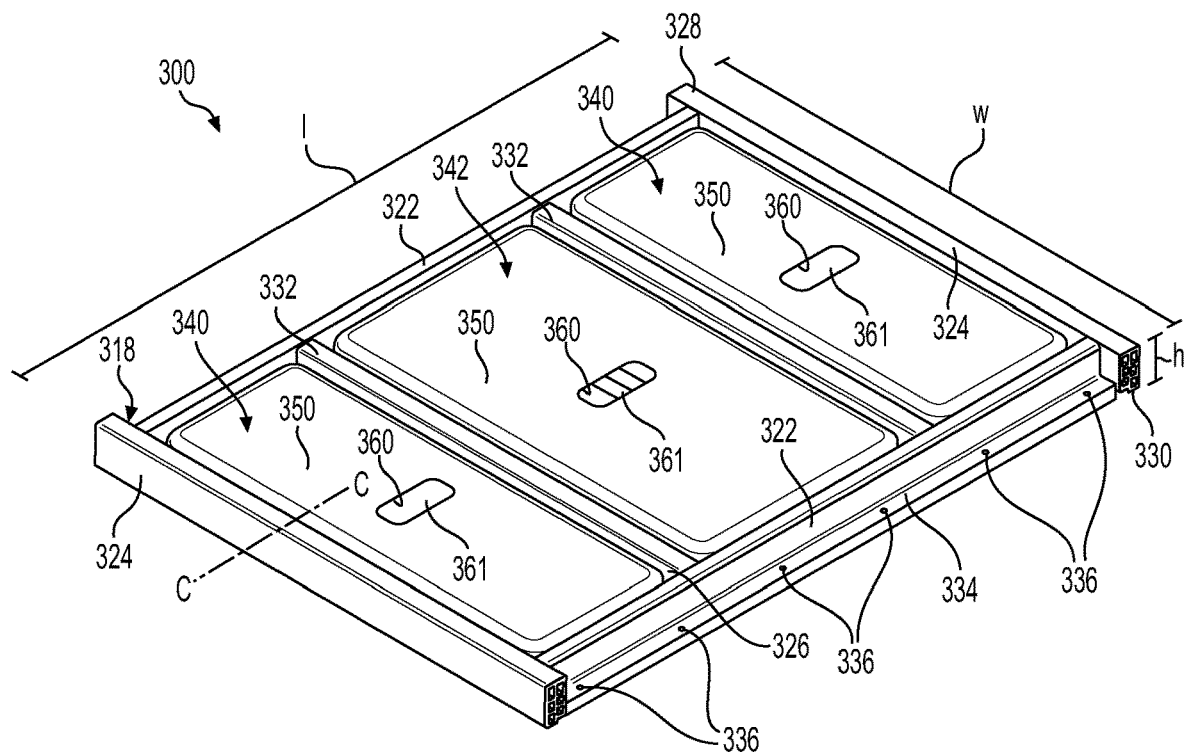
FIG. 16 is a perspective view of a battery frame holding three battery boxes in accordance with an aspect of the disclosure.

FIGS. 16-21 show a battery frame 300 holding three battery boxes 340, 342 in accordance with some embodiments. The battery frame 300 includes an outer frame 318 formed from a plurality of structural members 322, 324. In some embodiments, and as shown in FIG. 16, the structural members 322, 324 include a set of two first rails 322 extending parallel to and spaced apart from one another. The structural members 322, 324 also include a set of two second rails 324 extending parallel to and spaced apart from one another and extending between the first rails 322 and perpendicularly thereto. The structural members 322, 324 of the outer frame 318 surround an interior space 326. Together, the structural members 322, 324 define a flat rectangular shape with a length/and a width w and a height h that is substantially shorter than the length/and substantially shorter than the width w. The outer frame 318 defines a top 328 extending in a flat plane and a bottom 330 parallel to the top 328 and spaced apart therefrom by the height h of the outer frame 318. A pair of cross-beams 332 extend between the first rails 322 within the interior space 326. The cross-beams 332 may serve a number of different purposes, including holding and/or distributing weight of one or more battery boxes 340, 342, to increase stiffening or structural rigidity of the battery frame 300, and/or distributing or absorbing crash loads.

As shown in FIG. 16, each of the first rails 322 includes a mounting flange 334 extending outwardly away from the interior space 326 and defining a plurality of through holes 336 at regular intervals along a length of the first rails 322 for receiving fasteners, such as bolts or screws, for holding the battery frame 300 within a vehicle.

One or more battery boxes 340, 342 are disposed within the interior space 326 of the outer frame 318 and are removable from below the outer frame 318 with the outer frame 318 mounted within a vehicle. In other words, the battery frame 300 is configured to allow one or more of the battery boxes 340, 342 to be removed and/or installed through the bottom 330 of the outer frame 318 while the outer frame 318 is installed within a vehicle. In some embodiments, all of the battery boxes 340, 342 may be independently removable and installable from below the outer frame 318 with the battery frame 300 mounted as all or part of a lower part of a vehicle. The battery frame 300 may, for example, be mounted within a floor and/or between frame rails of a vehicle such as a passenger car or truck. Each of the battery boxes 340, 342 may be separately or independently removable and/or installable from below the outer frame 318 with the battery frame 300 mounted as all or part of a lower part of a vehicle. This may improve serviceability and/or manufacturability when compared to conventional (unitary) battery packs, which can weigh several hundred pounds, by allowing individual ones of the battery boxes 340, 342 to be installed or replaced without requiring the entire battery frame 300 to be removed from the vehicle.

FIG. 16 also shows each of the battery boxes 340, 342 including a cover 350 that defines a port 360 to provide access to a battery chamber 361 therein. The battery chamber 361 may be configured to hold one or more battery cells. The battery chamber 361 may also be configured to hold ancillary equipment, such as electrical conductors for charging and discharging the battery cells and/or temperature regulation equipment, such as heaters, radiators, or conduits for conveying heating or cooling fluids. The port 360 may be used for electrical connections to one or more external conductors (not shown) and/or for coolant fluid connections between the corresponding one of the battery boxes 340, 342 and external fluid conduits (not shown). In some embodiments, and as shown in FIG. 16, two or more battery boxes 340, 342 having different sizes are disposed within the battery frame 300. Specifically, FIG. 16 shows a second battery box 342 that is larger than each of the first battery boxes 340 and which is mounted between two of the cross-beams 332.

Figure 17:
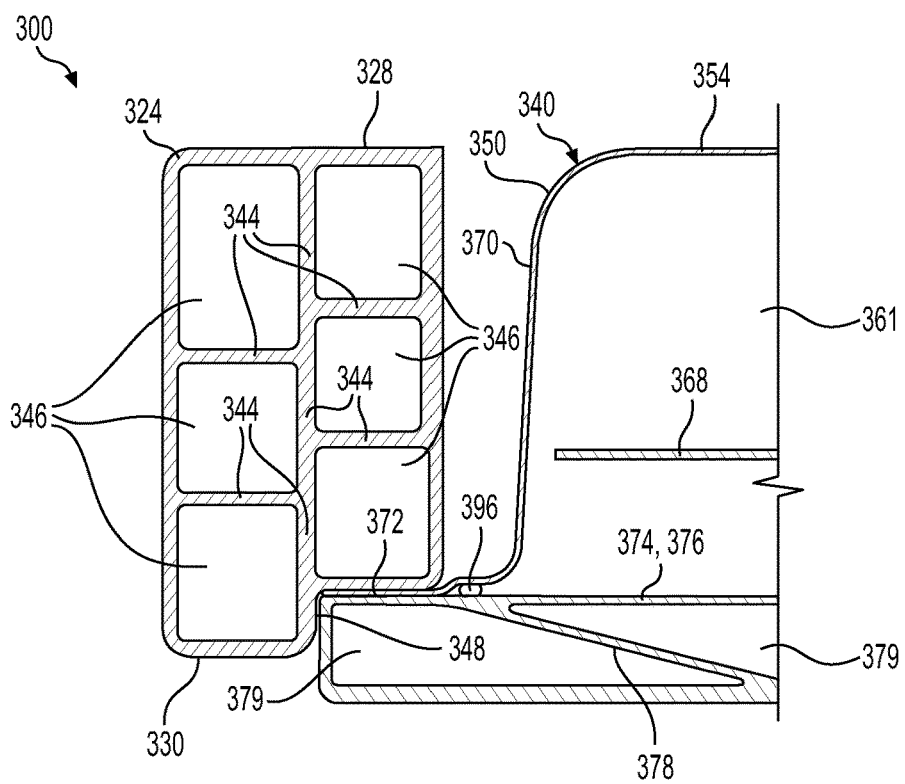
FIG. 17 is a cross-sectional view of the battery frame of FIG. 16 along line C-C.

FIG. 17 is a cross-sectional view of the battery frame 300 along line C-C. FIG. 17 shows internal details of one of the first battery boxes 340. Each of the battery boxes 340, 342 within the battery frame 300 may have a similar construction. As shown in FIG. 17, the cover 350 of the first battery box 340 has an inverted tray shape defining an upper wall 354 that extends in a generally flat plane that is coplanar with the top 328 of the outer frame 318 with the first battery box 340 mounted in the battery frame 300. The cover 350 also includes a peripheral wall 370 that surrounds the battery chamber 361 and which extends from the upper wall 354 to a lower flange 372 that extends outwardly from the peripheral wall 370 generally parallel to and spaced away from the upper wall 354. The cover 350 may be formed of a single piece of material, such as sheet metal, that is drawn, molded, cast, machined, or otherwise formed to define the inverted tray shape. Alternatively, the cover 350 may be formed as an assembly of two or more separate pieces that are joined together to define the inverted tray shape. A lower rib 368 is disposed within the battery chamber 361 for providing structural rigidity.

The first battery box 340 also includes a baseplate 374 comprising one or more elongate members 376 is disposed below the cover 350 for enclosing the battery chamber 361. The elongate members 376 have a generally rectangular and hollow cross-section with diagonal support members 378 disposed therein to define a plurality of internal passages 379. The internal passages 379 may be used to convey cooling fluid for regulating the temperature of the first battery box 340. The elongate members 376 may be formed from extruded metal, such as aluminum, magnesium, or an alloy of two or more metals. The elongate members 376 may have a constant cross-section along all or substantially all of their length. Alternatively, the elongate members 376 may be formed from one or more sheets of material, such as metal. Other materials, such as, for example, composites or polymers, may be used to form the cover 350 and/or the baseplate 374 of the battery boxes 340, 342. The lower flange 372 is disposed between the baseplate 374 and one or more of the structural members 322, 324 of the outer frame 318 with the corresponding one of the battery boxes 340, 342 mounted within the outer frame 318. More specifically, the lower flange 372 is sandwiched between the baseplate 374 and one or more of the structural members 322, 324 of the outer frame 318, with the lower flange 372 extending parallel to and contacting each of the baseplate 374 and one or more of the structural members 322, 324. A gasket 396 extends along the lower flange 372 between the peripheral wall 370 and the baseplate 374 for providing a watertight seal.

As also shown in FIG. 17, each of the second rails 324 has a generally rectangular shape except for a notch 348 in a lower edge thereof and extending upwardly from the bottom 330. The notch 348 faces the interior space 326 of the outer frame 318 for receiving one or more of the baseplate 374 of the battery boxes 340, 342. FIG. 17 also shows an internal webbing 344 within the second rail 324 to define a plurality of hollow passages 346, each having a generally rectangular cross-section.

Figure 18:
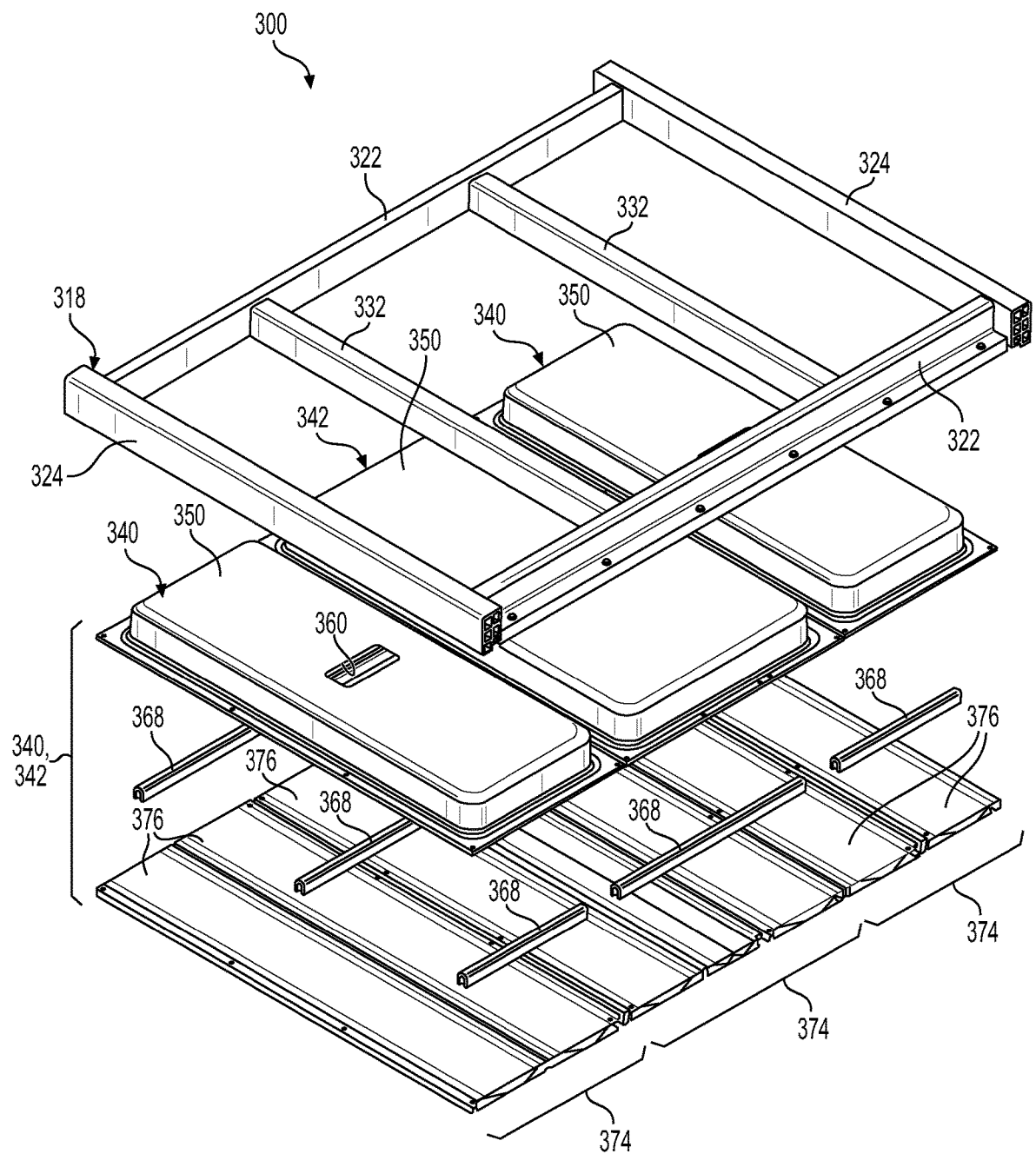
FIG. 18 is an exploded view of the battery frame of FIG. 16.

FIG. 18 is an exploded view of the battery frame 300 of FIG. 16. FIG. 18 shows the lower ribs 368 in more detail, with each of the lower ribs 368 having an inverted U-Shape. The lower ribs 368 may be formed from metal that is bent or otherwise formed into the inverted U-Shape. The lower ribs 368 may be secured to two or more of the elongate members 376 for joining them together and forming the baseplates 374.

Figure 19:
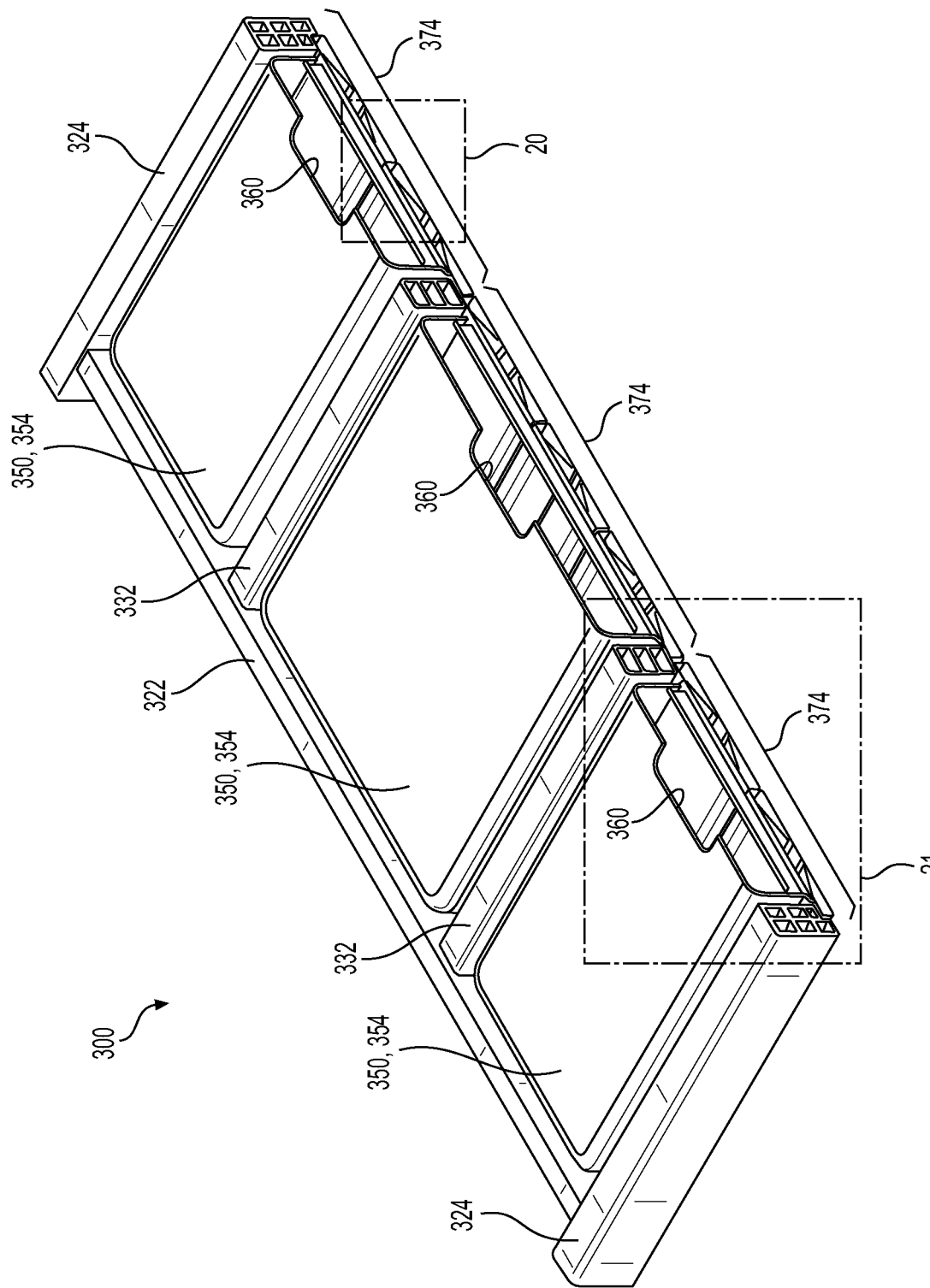
FIG. 19 is a perspective cut-away view of the battery frame of FIG. 16.
Figure 21:
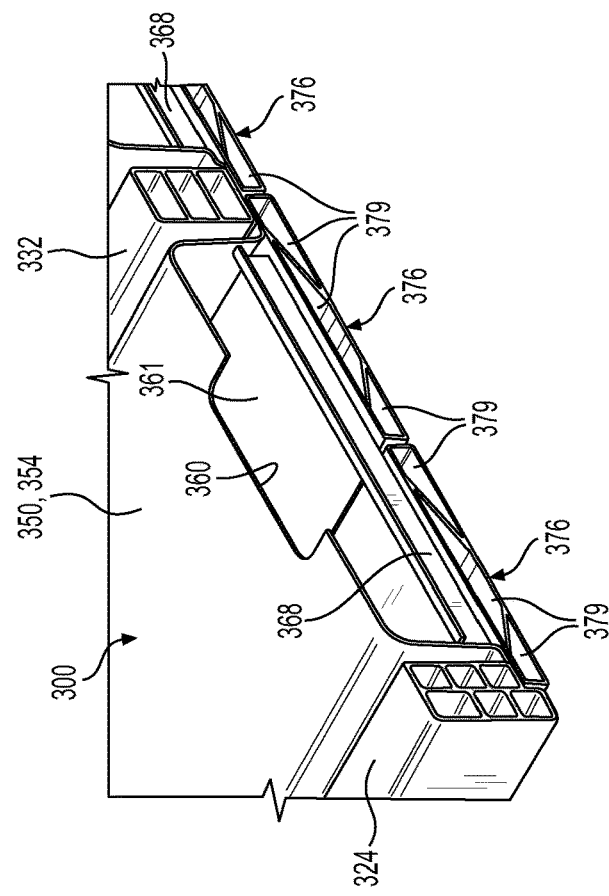
FIG. 21 is an enlarged view of section 21 of FIG. 19.
Figure 20:
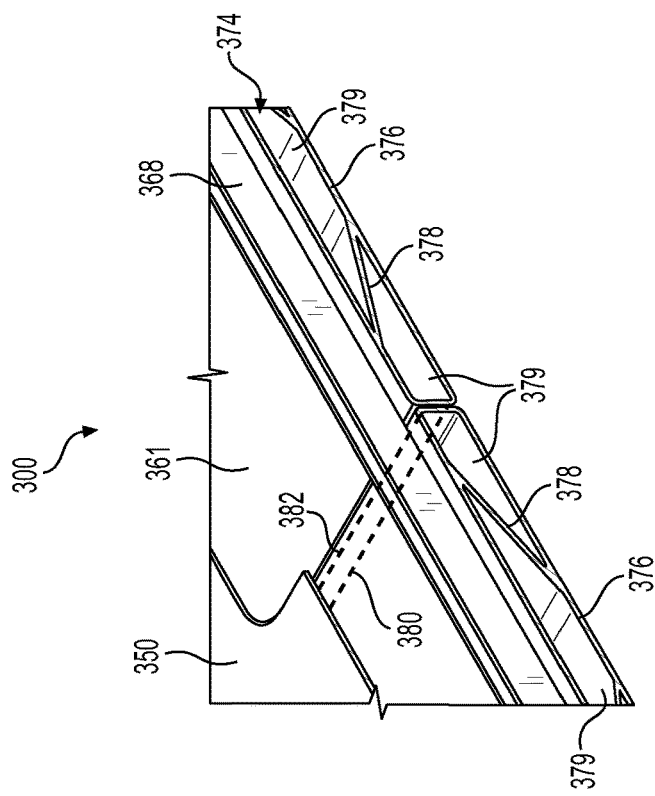
FIG. 20 is an enlarged view of section 20 of FIG. 19.

FIG. 19 is a cut-away perspective view showing a cross-section of the battery frame 300. FIG. 20 is an enlarged view of section 20 of FIG. 19, and FIG. 21 is an enlarged view of section 21 of FIG. 19. FIG. 20 shows a structural weld 380 that extends between adjoining sides of two of the elongate members 376 for joining the elongate members 376 together and forming one of the baseplates 374. The structural weld 380 may be a friction stir weld, although other types of welds may be used. FIG. 20 also shows a watertight seal 382 that extends parallel to and spaced apart from the structural weld 380 between the adjoining sides of the two elongate members 376. The watertight seal 382 may be a friction stir weld, although other types of welds or seals may be used. The watertight seal 382 may include a sealant, such as a caulk or an adhesive, and/or a gasket of resilient material, such as rubber or foam.

The battery frame 300 of FIGS. 16-21 may provide several advantages over other designs, such as conventional battery packs. The battery frame 300 provides for improved scalability as a result of the battery boxes 340, 342 having two different sizes. It includes a simple watertight seal using 2-dimensional friction stir welds that can be relatively easily manufactured. Internal and/or external cooling is possible. The outer frame 318 may be made from a combination of aluminum and/or steel. The battery boxes 340, 342 can be installed or removed from the outer frame 318 from below, allowing installation or replacement without removing the entire battery frame 300 from the vehicle.

FIGS. 22-26 show a battery frame 400 in accordance with some embodiments. Specifically, the battery frame 400 includes an outer frame 418 formed from structural members 422, 424 including a set of two first rails 422 extending parallel to and spaced apart from one another. The structural members 422, 424 also include a set of two second rails 424 extending parallel to and spaced apart from one another and extending between the first rails 422 and perpendicularly thereto. Together, the structural members 422, 424 surround an interior space 426. Together, the structural members 422, 424 define a flat rectangular shape with a length/and a width w and a height h that is substantially shorter than the length/and substantially shorter than the width w. The outer frame 418 defines a top 428 extending in a flat plane and a bottom 430 parallel to the top 428 and spaced apart therefrom by the height h of the outer frame 418. The first rails 422 each include a mounting flange 434 extending outwardly away from the interior space 226. Each of the mounting flanges 434 defines a plurality of through holes 436 at regular intervals along a length of the first rails 422 for receiving fasteners, such as bolts or screws, for holding the battery frame 400 within a vehicle.

Figure 22:
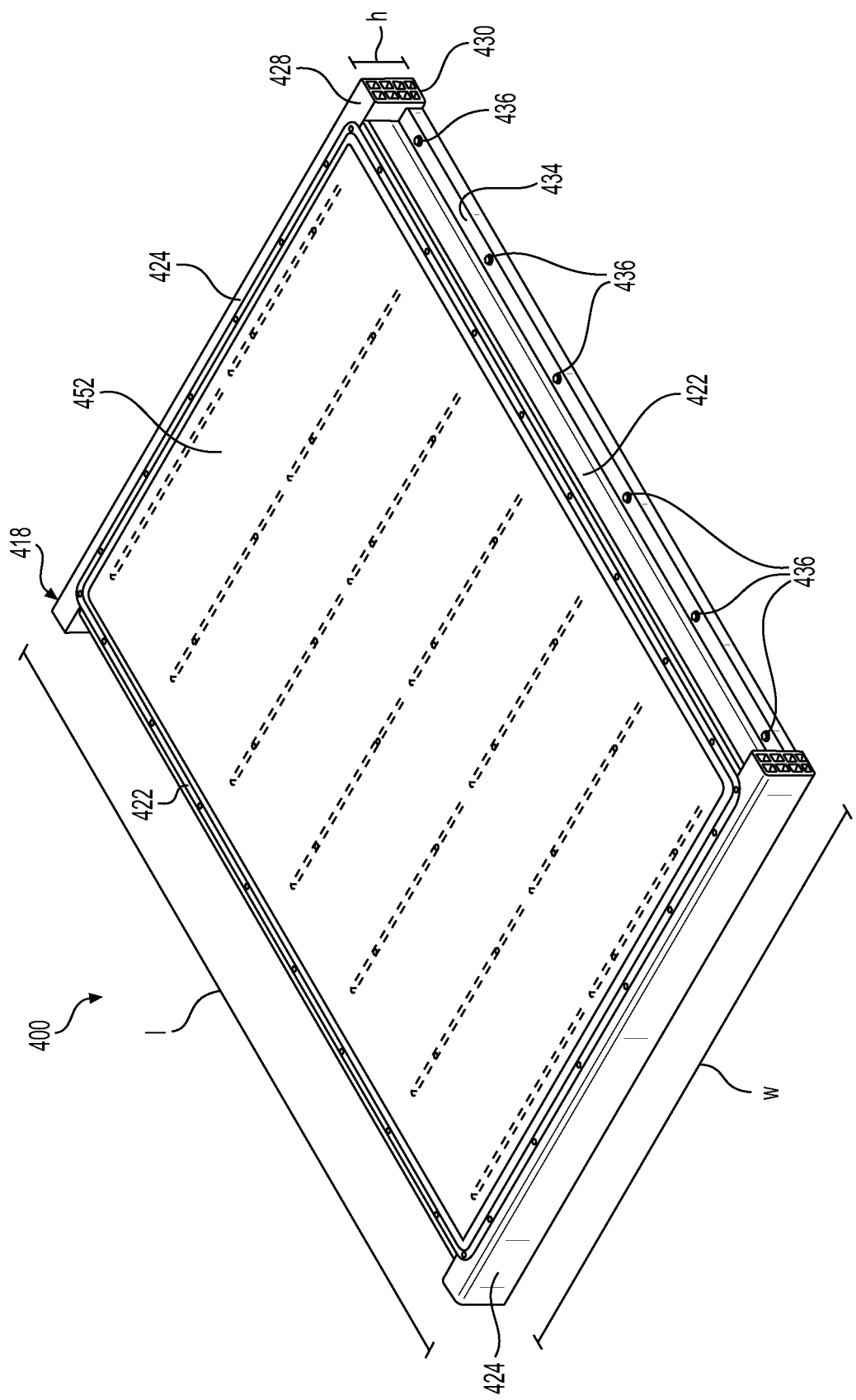
FIG. 22 is a perspective view of a battery frame in accordance with an aspect of the disclosure.
Figure 23:
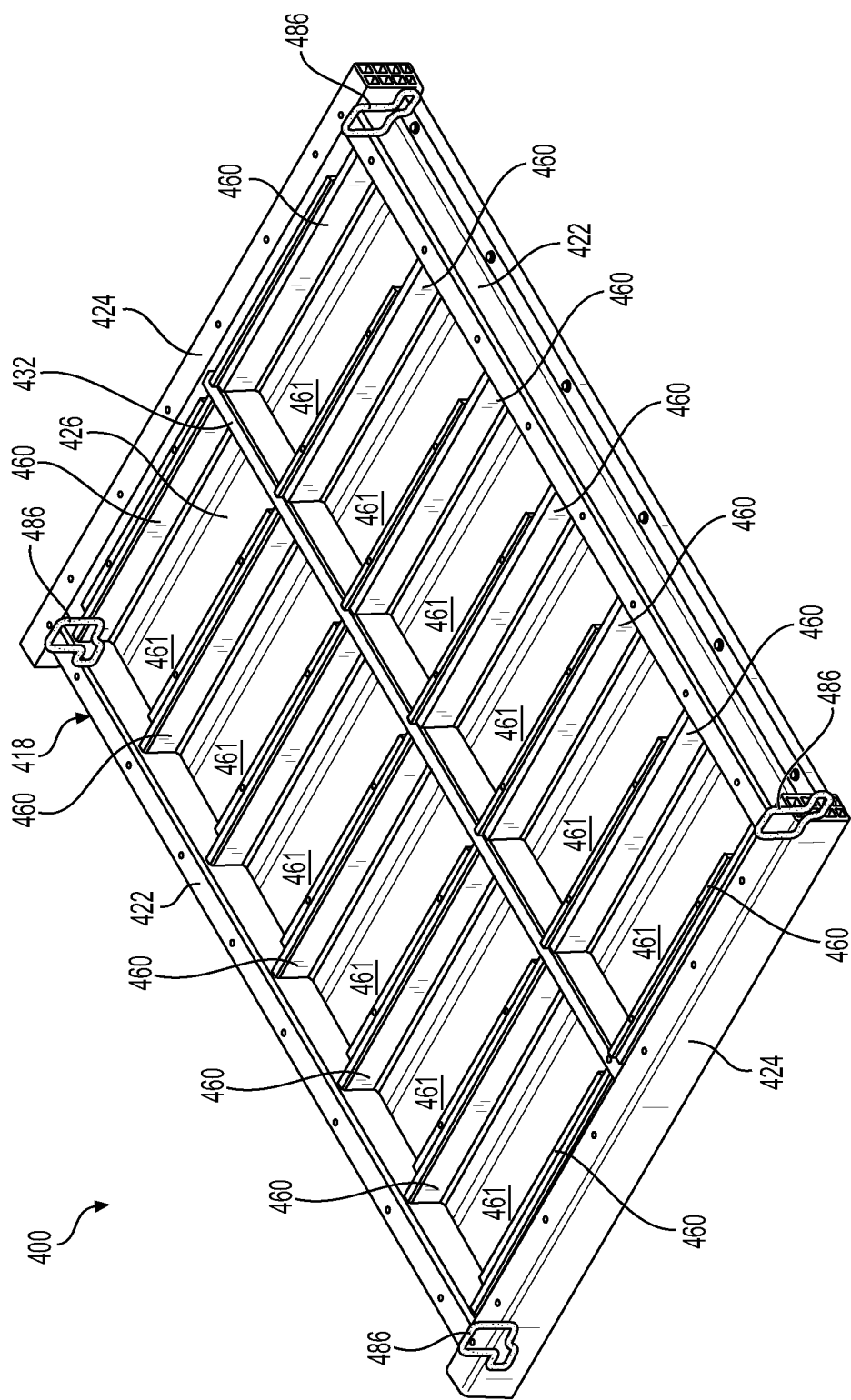
FIG. 23 is a perspective view of the battery frame of FIG. 22 with a partial transparency to show internal structure.

FIG. 23 is a perspective view of the battery frame of FIG. 22 with a partial transparency to illustrate locations of end welds 286 connecting each of two ends of each of the first rails 422 to a side of each of the second rails 424 adjacent an end thereof. The end welds 486 may be watertight to prevent water or other fluids from entering the interior space 226. In some embodiments, the end welds 486 may be friction stir welds, although other types of welds and/or sealants may be used, which may depend on the types of materials used for either or both of the rails 422, 424.

As also shown in FIG. 23, a cross-beam 432 extends between the second rails 424 within the interior space 426 mid-way between the first rails 422. The cross-beam 432 may serve a number of different purposes, including stiffening or structural rigidity of the battery frame 400, and/or distributing or absorbing crash loads. A plurality of crossbars 460 extend perpendicularly from the cross-beam 432 to each of the first rails 422 at regular intervals to define twelve battery chambers 461, each having a rectangular shape.

Each of the battery chambers 461 is configured to hold one or more batteries that are removable from below the outer frame 418 with the outer frame 418 mounted within a vehicle. In other words, the battery frame 400 is configured to allow one or more of the batteries to be removed and/or installed through the bottom 430 of the outer frame 418 while the outer frame 218 is installed within a vehicle. The battery frame 400 may, for example, be mounted within a floor and/or between frame rails of a vehicle such as a passenger car or truck. This may improve serviceability and/or manufacturability when compared to conventional (unitary) battery packs, which can weigh several hundred pounds, by allowing individual batteries to be installed or replaced without requiring the entire battery frame 400 to be removed from the vehicle.

Figure 24:
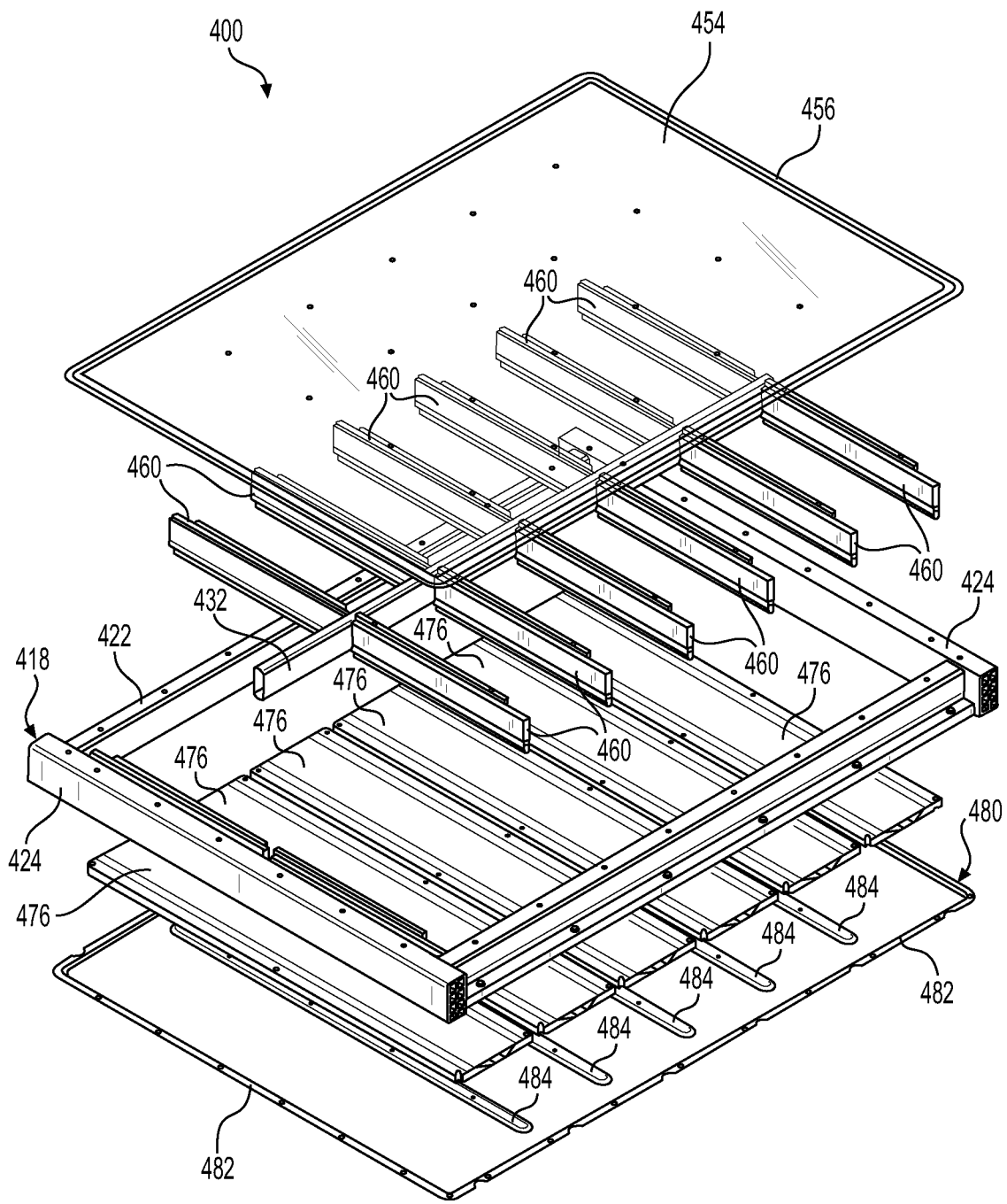
FIG. 24 is an exploded view of the battery frame of FIG. 22.

FIG. 24 is an exploded view of the battery frame 400 including a lid 454 that encloses the top 428 of the outer frame 218 and a lower plate 480 that encloses the bottom 430 of the outer frame 418. The lid 454 includes a rim 456 extending about a peripheral edge thereof. The lower plate 480 has a generally flat shape with a peripheral edge 482 that is bent upwardly and outwardly. The lower plate 480 may be formed of metal or another resilient material, such as plastic or a composite material. As shown in FIG. 24, the lower plate 480 includes a plurality of recessed portions 484 that each extend for a length upwardly toward the outer frame to provide structural rigidity. Each of the recessed portions 484 aligns with a corresponding one of the crossbars 460 and defines holes at regular intervals for receiving fasteners, such as screws or bolts (not shown) for securing the crossbars 460 to the lower plate 480.

Figure 25:
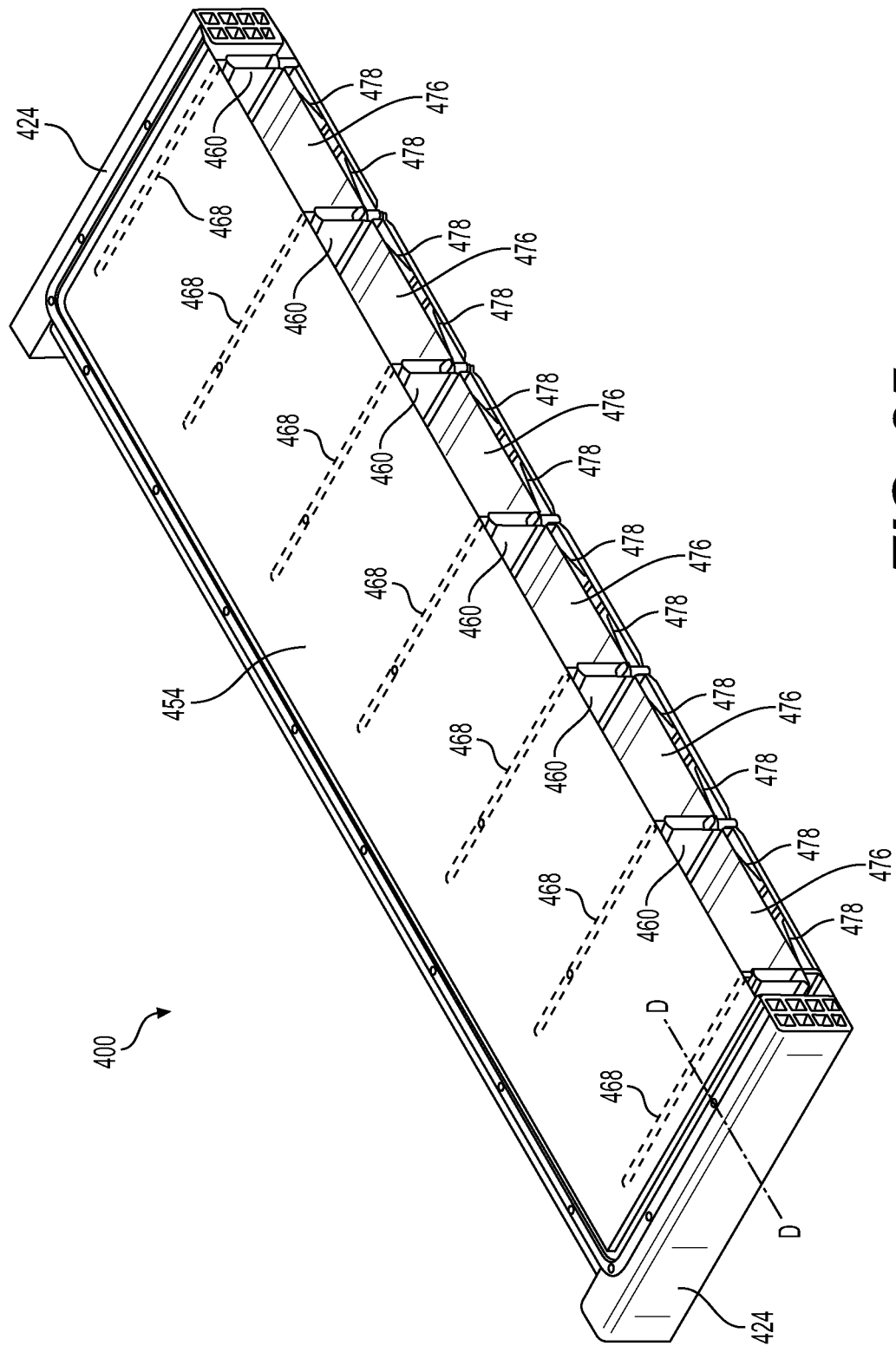
FIG. 25 is a perspective cut-away view of the battery frame of FIG. 22.

FIG. 25 is a cut-away perspective view showing a cross-section of the battery frame 400. The battery frame 400 includes a plurality of elongate members 476 each having a generally rectangular and hollow cross-section with diagonal support members 478 disposed therein to define a plurality of internal passages, which may be used to convey cooling fluid for regulating the temperature batteries located thereupon. The elongate members 476 may also serve to improve performance of the battery frame 400 in various crash tests, such as a bollard crash test. The elongate members 476 may be formed from extruded metal, such as aluminum, magnesium, or an alloy of two or more metals. The elongate members 476 may have a constant cross-section along all or substantially all of their length. Alternatively, the elongate members 476 may be formed from one or more sheets of material, such as metal.

Figure 26:
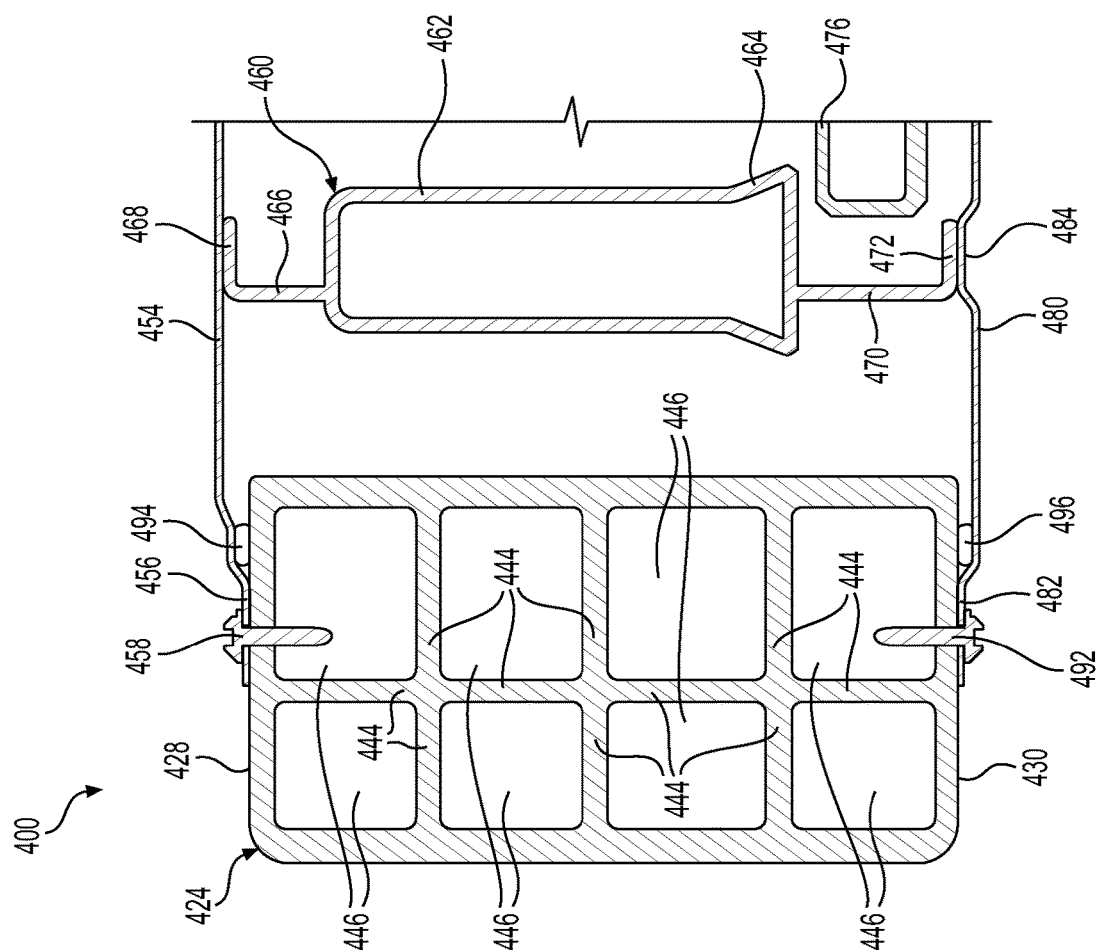
FIG. 26 is a cross-sectional view of the battery frame of FIG. 25 along line D-D.

FIG. 26 is a cross-sectional view of the battery frame 400 along line D-D as shown in FIG. 25. Specifically, FIG. 26 shows a cross-section of one of the second rails 424 having a generally rectangular cross-section, with an internal webbing 444 therein to define a plurality of hollow passages 446, each having a generally rectangular cross-section. FIG. 26 also shows the profile of the lid 454 including the rim 456 extending along and adjacent to the top 428 of the second rail 424 and secured thereto with a lid screw 458. The lid 454 may be secured to each of the rails 422, 424 with a plurality of lid screws 458 at regular intervals. Alternatively or additionally, other fasteners such as bolts, clips, or clamps and/or an adhesive or a weld may be used to secure the lid 454 to the rails 422, 424. An upper gasket 494 of resilient material, such as rubber or foam, is sandwiched between the top 428 of the rails 422, 424 and the lid 454 for providing a watertight seal therebetween. FIG. 26 also shows the peripheral edge 482 of the lower plate 480 secured to the bottom 430 of the second rail 424 with a plate screw 492. The lower plate 480 may be secured to each of the rails 422, 424 with a plurality of plate screw 492 at regular intervals. Alternatively or additionally, other fasteners such as bolts, clips, or clamps and/or an adhesive or a weld may be used to secure the lower plate 480 to the rails 422, 424. A lower gasket 496 of resilient material, such as rubber or foam, is sandwiched between the bottom 430 of the rails 422, 424 and the lower plate 480 for providing a watertight seal therebetween.

Figure 28:
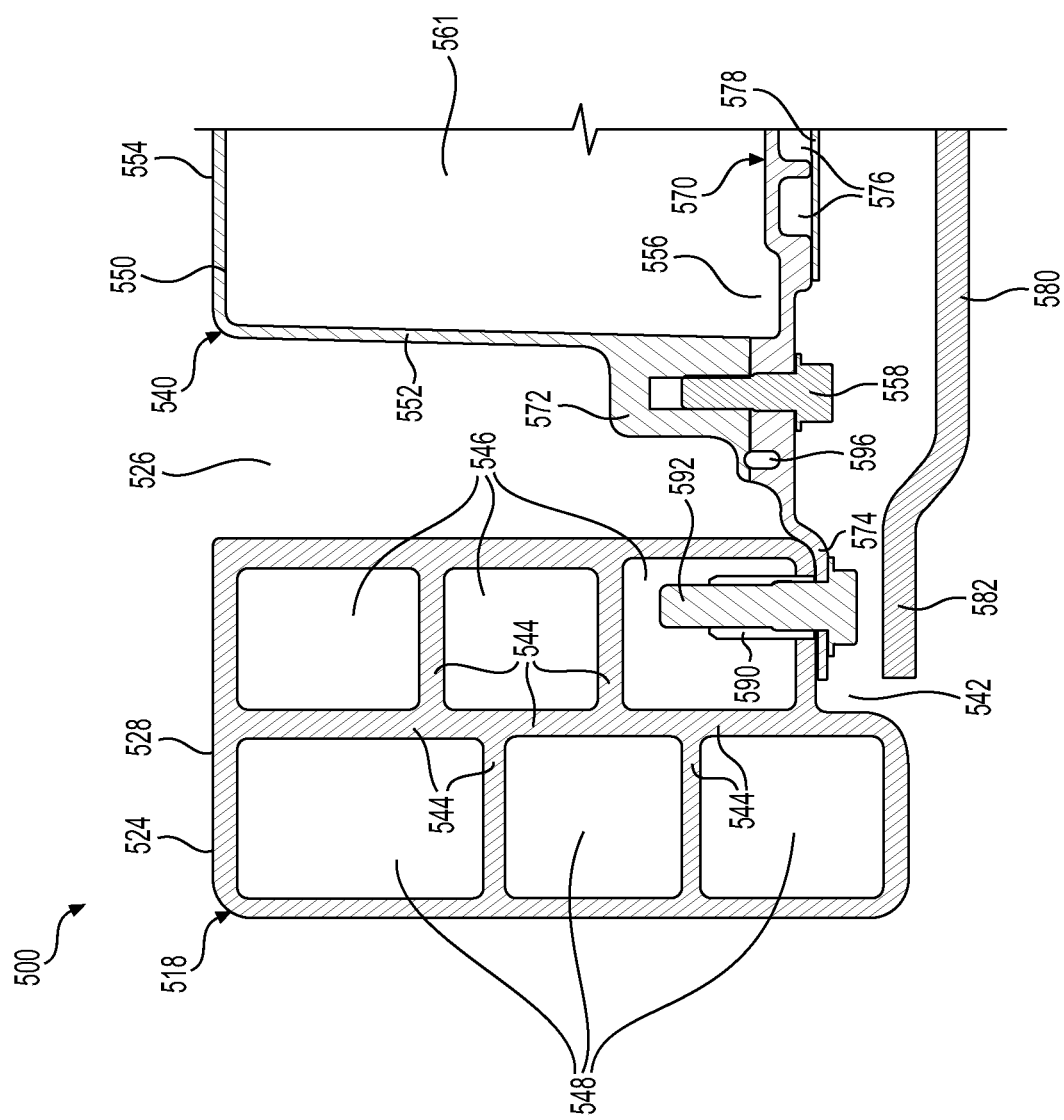
FIG. 28 shows a cross-section of the battery frame of FIG. 27 along line E-E.

FIG. 28 also shows a cross-section of one of the crossbars 460. All of the crossbars 460 may have a similar construction, which may be formed from one or more pieces of extruded metal, such as aluminum, magnesium, or an alloy of two or more metals. The crossbars 460 may have a constant cross-section along all or substantially all of their length. Specifically, each of the crossbars 460 includes a body portion 462 having a generally rectangular and hollow shape that may be used as a conduit for cooling fluid and/or for routing electrical conductors. The body portion 462 defines a flared bottom that extends outwardly for preventing a corresponding one of the elongate members 476 from moving upwardly between the body portions 462. Each of the crossbars 460 also includes an upper portion 466 extending upwardly from the body portion 462 to an upper flange 468 that is secured to the lid 454 with one or more fasteners, such as screws or bolts or clips or rivets. Alternatively or additionally, the upper flange 468 may be secured to the lid 454 with one or more welds. Each of the crossbars 460 also includes a lower portion 470 extending downwardly from the body portion 462 to a lower flange 472 that is secured to the lower plate 480 along one of the recessed portions 484 with one or more fasteners, such as screws or bolts or clips or rivets. Alternatively or additionally, the lower flange 472 may be secured to the lower plate 480 with one or more welds. Together, the body portion 462, the lower portion 470, and the lower flange 472 define a C-shaped cross-section configured to receive and retain an end of a corresponding one of the elongate members 476. Each of the elongate members 476 and batteries disposed thereupon, may be removed from below the battery frame 400 by removing the lower plate 480 and deflecting one or more of the crossbars 460 outwardly. Each of the batteries may be separately or independently removable and/or installable from below the outer frame 418 with the battery frame 400 mounted as all or part of a lower part of a vehicle by removing or displacing individual ones of the elongate members 476.

The battery frame 400 of FIGS. 22-26 may provide several advantages over other designs, such as conventional battery packs. The battery frame 400 provides for a relatively high energy density when compared with other, alternative designs. The elongate members 476 may function to distribute and/or absorb crash loads, such as crush loads and/or loads generated in a bollard crash test. The elongate members 476 may also define cooling passages for circulation of cooling fluid for regulating the temperature of the batteries disposed thereupon. The battery frame 400 may include closing plates (i.e. the lid 454 and the lower plate 480) that are each formed from very thin sheet metal. The battery frame 400 may be configured to use a single connection block to provide electrical and/or cooling fluid connections to the vehicle. The outer frame 318 and/or the internal supports, such as the cross-beam 432 and/or the crossbars 460, may be made from a combination of aluminum and/or steel.

Figure 27:
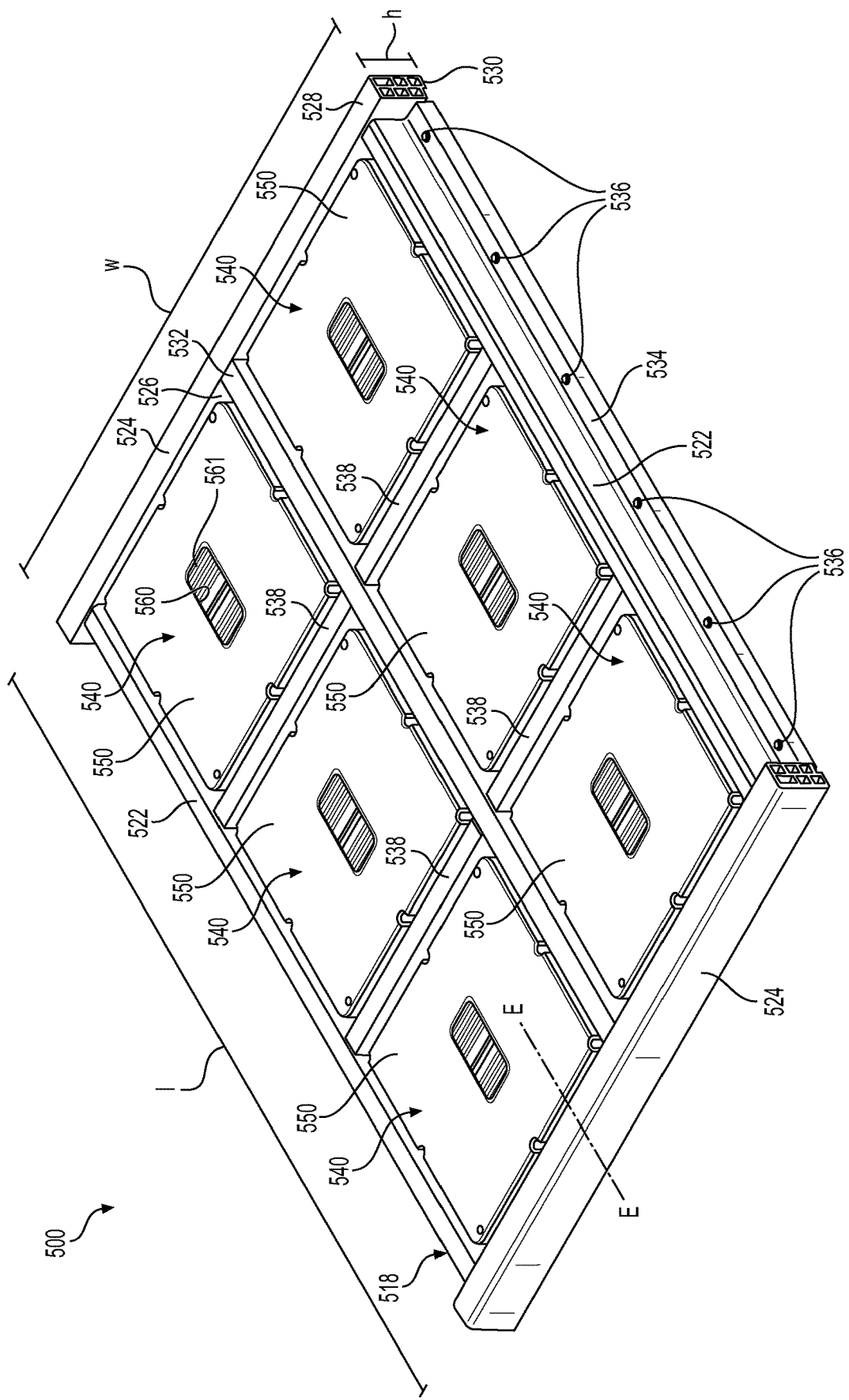
FIG. 27 is a perspective view of a battery frame holding three battery boxes in accordance with an aspect of the disclosure.
Figure 29:
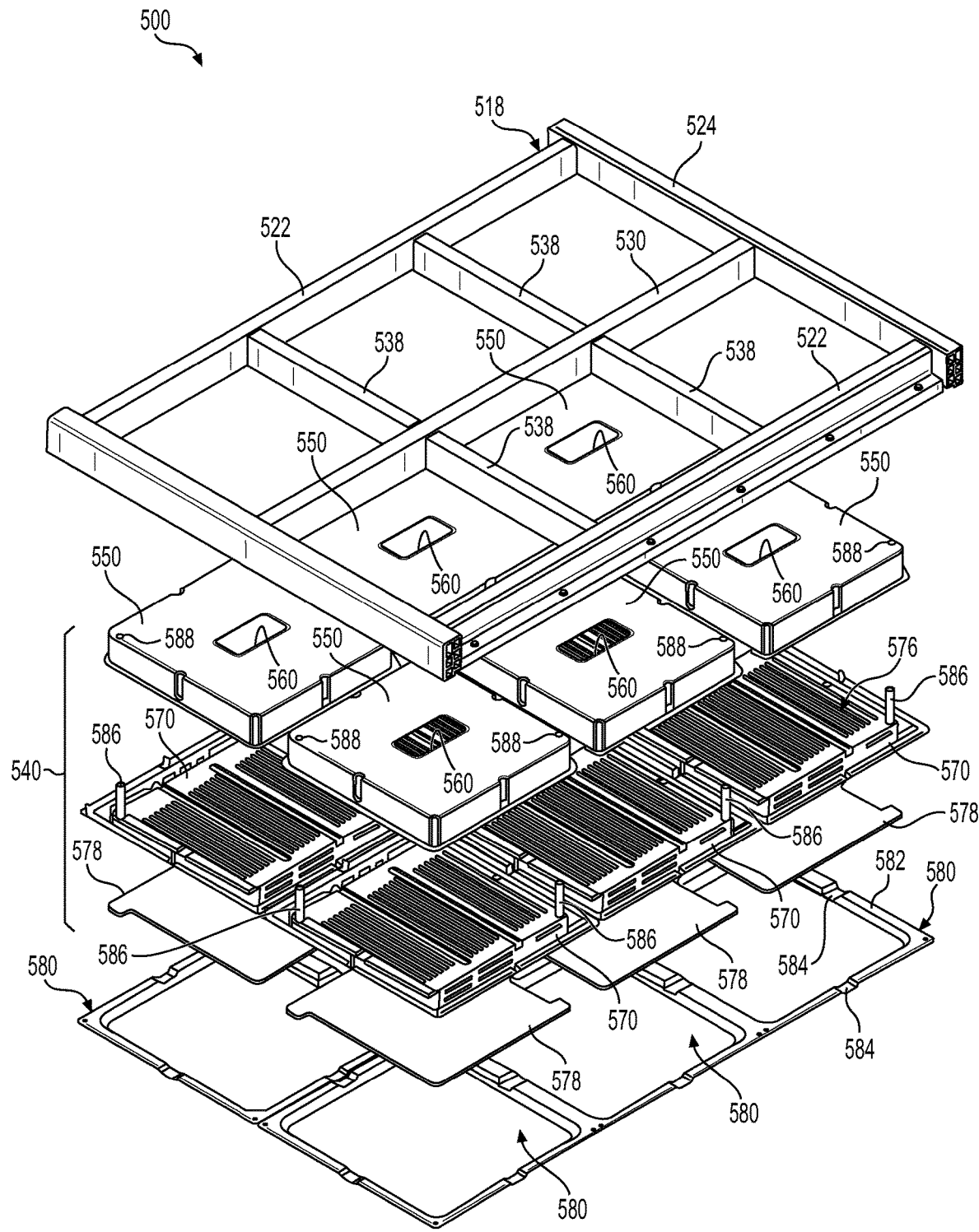
FIG. 29 is an exploded view of the battery frame of FIG. 27.

FIGS. 27-29 show a battery frame 500 in accordance with some embodiments. Specifically, the battery frame 500 includes an outer frame 518 formed from structural members 522, 524 including a set of two first rails 522 extending parallel to and spaced apart from one another. The structural members 522, 524 also include a set of two second rails 524 extending parallel to and spaced apart from one another and extending between the first rails 522 and perpendicularly thereto. Together, the structural members 522, 524 surround an interior space 526. Together, the structural members 522, 524 define a flat rectangular shape with a length l and a width w and a height h that is substantially shorter than the length l and substantially shorter than the width w. The outer frame 518 defines a top 528 extending in a flat plane and a bottom 530 parallel to the top 528 and spaced apart therefrom by the height h of the outer frame 518. The first rails 522 each include a mounting flange 534 extending outwardly away from the interior space 526 and defining a plurality of through holes 536 at regular intervals along a length of the first rails 522 for receiving fasteners, such as bolts or screws, for holding the battery frame 500 within a vehicle. A cross-beam 532 extends between the second rails 524 within the interior space 526 mid-way between the first rails 522. The cross-beam 532 may serve a number of different purposes, including stiffening or structural rigidity of the battery frame 500, and/or distributing or absorbing crash loads. A pair of crossbars 538 extends between the cross-beam 532 and each of the first rails 522 to divide the interior space 526 into six equal segments, each containing a battery box 540. Each of the battery boxes 540 includes an upper housing 550 that defines a port 560 to provide access to a battery chamber 561 within the battery box 540. The ports 560 may be used for electrical connections to one or more external conductors (not shown) and/or for coolant fluid connections between the battery boxes 540 and external fluid conduits (not shown).

One or more of the battery boxes 540 are disposed within the interior space 526 of the outer frame 518 and are removable from below the outer frame 518 with the outer frame 518 mounted within a vehicle. In other words, the battery frame 500 is configured to allow one or more of the battery boxes 540 to be removed and/or installed through the bottom 530 of the outer frame 518 while the outer frame 518 is installed within a vehicle. In some embodiments, all of the battery boxes 540 may be independently removable and installable from below the outer frame 518 with the battery frame 500 mounted as all or part of a lower part of a vehicle. The battery frame 500 may, for example, be mounted within a floor and/or between frame rails of a vehicle such as a passenger car or truck. Each of the battery boxes 540 may be separately or independently removable and/or installable from below the outer frame 518 with the battery frame 500 mounted as all or part of a lower part of a vehicle. This may improve serviceability and/or manufacturability when compared to conventional (unitary) battery packs, which can weigh several hundred pounds, by allowing individual ones of the battery boxes 540 to be installed or replaced without requiring the entire battery frame 500 to be removed from the vehicle.

FIG. 28 is a cross-sectional view of the battery frame 500 FIG. 27 along line E-E. Specifically, FIG. 28 shows the connection between one of the battery boxes 540 and the outer frame 518 of the battery frame 500. FIG. 28 shows details of one of the battery boxes 540. Each of the battery boxes 540 may have an identical construction. Alternatively, the battery boxes 540 may be different from one another. For example, two battery boxes having different sizes may be used within the battery frame 500. In the example embodiment shown in FIGS. 27-29, the upper housing 550 includes an upper wall 554 that is flat and coplanar with the top 528 of the outer frame 518. The upper housing 550 also includes a peripheral wall 552 having four equal sides and which encircles battery chamber 561. The upper housing defines an open bottom 556. As shown in FIG. 28, the upper housing 550 also includes a rim portion 572 that surrounds the open bottom, and which may be thicker than the peripheral wall 552 and configured to receive a box bolt 558. The upper housing 550 may be formed as a single piece by, for example, casting and/or machining. Alternatively, the upper housing 550 may be as an assembly of two or more pieces that may be joined, for example, by welding.

The battery box 540 also includes a floor plate 570 configured to enclose the open bottom 556 of the upper housing 550. The floor plate 570 includes a peripheral flange 574 that extends outwardly beyond the upper housing 550 and around the periphery of the battery box 540 for mounting the battery box 540 within the outer frame 518. A gasket 596 is disposed within a channel between upper housing 550 and the floor plate 570 to provide a waterproof seal therebetween. The floor plate 570 also defines a plurality of cooling channels 576 upon an outside surface thereof for conveying a cooling fluid to regulate the temperature of the battery box 540, and particularly to regulate the temperature of one or more battery cells within the battery box 540. A sealing plate 578 is disposed along the floor plate 570 to enclose the cooling channels 576. The floor plate 570 may be formed as a single piece by, for example, casting and/or machining. Alternatively, the floor plate 570 may be as an assembly of two or more pieces that may be joined, for example, by welding.

FIG. 28 also shows a cross-section of one of the second rails 524 having a generally rectangular shape except for a notch 542 in a lower edge thereof. The notch 542 faces the interior space 526 of the outer frame 518 for receiving the peripheral flange 574 holding the battery boxes 540. An internal webbing 544 is disposed within the second rail 524 to define a plurality of hollow passages 546 each having a generally rectangular cross-section. A rivet nut 590 extends upwardly into the second rail 524 within the notch 542 for receiving a mounting bolt 592 for holding the peripheral flange 574 of one of the battery boxes 540 to the second rail 524. In other words, each the battery boxes 540 is held within the outer frame 518 by the peripheral flange 574, which support the battery box 540 with fasteners in the form of the mounting bolts 592, which connect the peripheral flange 574 to one of the structural members 122, 124 of the outer frame 118. Other types of fasteners such as, for example, screws, rivets, clips, or clamps may connect the battery boxes 540 to the outer frame 518.

FIG. 28 also shows a lower plate 580 for protecting batteries and other equipment from damage from below, such as may be caused by road debris. The lower plate 580 may be formed of metal or another resilient material, such as plastic or a composite material. The lower plate 580 may also serve to improve performance of the battery frame 500 in various crash tests, such as a bollard crash test. The lower plate 580 may have a generally flat shape with a peripheral edge 582 that is bent upwardly and outwardly and which extends into the notch 542 in the second rails 524.

FIG. 29 is an exploded view of the battery frame of FIG. 27. FIG. 29 shows the floor plates 570 including tubular members 586 that extend upwardly through the upper housing 550 and which are in fluid communication with openings 588 in the upper housing 550 for circulation of cooling fluid to and from the cooling channels 576 in the floor plates 570. FIG. 29 also shows the lower plates 580 disposed below the battery boxes 540. The peripheral edge 582 of the lower plates 580 defines lowered portions 584 that extend downwardly away from the outer frame 518 to provide clearance for the mounting bolts 592 and to prevent the lower plate 580 from contacting the mounting bolts 592. FIG. 29 shows separate lower plates 580 disposed below each of the battery boxes 540. Alternatively, a lower plate 580 may be disposed below two or more of the battery boxes 540. In some embodiments, the battery frame 500 may have a single lower plate disposed along the bottom 530 of all of the outer frame 518.

The battery frame 500 of FIGS. 27-29 may provide several advantages over other designs, including conventional battery packs. The battery frame 500 may include relatively small battery boxes 540 having housings 550, 570 of cast metal that may be formed with integrated cooling channels 576. The battery frame 500 may be manufactured without any watertight welds.

The battery boxes 540 can be installed or removed from the outer frame 518 from below, allowing installation or replacement without removing the entire battery frame 500 from the vehicle. The battery frame 500 can be constructed using various combinations of materials. The relatively small battery boxes 540 allow the battery frame 500 to be easily scaled to include a number of the battery boxes 540 to meet different capacity requirements. In other words, variations of the battery frame 500 may be manufactured using different numbers of the battery boxes 540 for different applications. For example, a smaller version of the battery frame 500 may be used in a plug-in hybrid electric vehicle (PHEV) application, while a larger version of the battery frame 500 may be used in a full battery electric vehicle (BEV) application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery frame comprising:
    a plurality of structural members defining an outer frame having a flat shape with a length and a width and a height shorter than the length and shorter than the width;
    at least one battery box disposed within the outer frame and removable from below the outer frame with the outer frame mounted within a vehicle; and
    wherein the at least one battery box includes:
    a housing defining a peripheral wall, a lid secured to the housing, a structure located within the housing, a gasket disposed around a top of the peripheral wall of the housing, and a spacer disposed between the lid and the structure, wherein the spacer is configured to provide a consistent deformation of the gasket.

2. The battery frame of claim 1, wherein the plurality of structural members comprise two first rails extending parallel to and spaced apart from one another and two second rails extending parallel to and spaced apart from one another and perpendicular to the first rails.

3. The battery frame of claim 2, wherein at least one of the first rails or the second rails is formed of metal having a constant cross-section along an entire length thereof.

4. The battery frame of claim 2, wherein at least one of the first rails or the second rails is formed of extruded aluminum.

5. The battery frame of claim 1, wherein the at least one battery box includes two or more battery boxes each configured to be independently installed within the outer frame, and wherein the two or more battery boxes have different sizes.

6. The battery frame of claim 1, wherein the at least one battery box comprises a housing having a peripheral wall and a floor pan and defining an open top, the at least one battery box also comprises a lid enclosing the open top of the housing; and
  wherein the at least one battery box is held within the outer frame by a bracket supporting the at least one battery box and with a fastener connecting the bracket to one of the plurality of structural members of the outer frame.

7. The battery frame of claim 6, wherein the bracket has a cross-section shaped as an inverted-T.

8. The battery frame of claim 1, wherein the at least one battery box includes a cover sealed to a baseplate of extruded metal.

9. The battery frame of claim 8, wherein the cover includes a lower flange disposed between the baseplate and one of the structural members of the outer frame.

10. The battery frame of claim 8, wherein the baseplate of extruded metal comprises two elongate members of extruded metal secured together along an adjoining side edge of each of the two elongate members.

11. The battery frame of claim 10, further comprising:
  a structural weld securing together the two elongate members of the baseplate; and
  a watertight seal extending between the two elongate members and spaced apart from the structural weld.

12. The battery frame of claim 1, wherein the at least one battery box comprises a housing having an open bottom, and a floor plate enclosing the open bottom of the housing, the floor plate extending outwardly beyond the housing to define a peripheral flange; and
  wherein the at least one battery box is secured within the outer frame by a fastener connecting the peripheral flange to one of the plurality of structural members of the outer frame.

13. The battery frame of claim 1, wherein the structure includes a crossbar having an upper portion that extends generally parallel to the lid, and wherein the spacer is provided between the lid and the upper portion of the crossbar.

14. The battery frame of claim 13, wherein the upper portion of the crossbar is further configured to receive lid bolts for securing secure the lid onto the housing.

* * * * *